United States Patent
Kuisma et al.

(10) Patent No.: US 11,415,416 B2
(45) Date of Patent: Aug. 16, 2022

(54) VIBRATION-ROBUST MULTIAXIS GYROSCOPE

(71) Applicant: MURATA MANUFACTURING CO., LTD., Nagaokakyo (JP)

(72) Inventors: Heikki Kuisma, Helsinki (FI); Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 318 days.

(21) Appl. No.: 16/707,126

(22) Filed: Dec. 9, 2019

(65) Prior Publication Data

US 2020/0200534 A1 Jun. 25, 2020

(30) Foreign Application Priority Data

Dec. 19, 2018 (FI) ..................................... 20186114

(51) Int. Cl.
*G01C 19/5684* (2012.01)
*G01C 19/22* (2006.01)

(52) U.S. Cl.
CPC ......... *G01C 19/5684* (2013.01); *G01C 19/22* (2013.01)

(58) Field of Classification Search
CPC ... G01C 19/5684; G01C 19/22; G01C 19/574
See application file for complete search history.

(56) References Cited

U.S. PATENT DOCUMENTS

| 6,520,015 B1 | 2/2003 | Alause et al. |
| 2004/0211258 A1 | 10/2004 | Geen |
| 2006/0219006 A1 | 10/2006 | Nasiri et al. |
| 2007/0214883 A1 | 9/2007 | Durante et al. |

(Continued)

FOREIGN PATENT DOCUMENTS

| EP | 2 610 588 A2 | 7/2013 |
| JP | 2010-078397 A | 4/2010 |

(Continued)

OTHER PUBLICATIONS

Apr. 15, 2020 Search Report issued in European Patent Application No. 19209901.

(Continued)

*Primary Examiner* — Xin Y Zhong
(74) *Attorney, Agent, or Firm* — Squire Patton Boggs (US) LLP

(57) ABSTRACT

This disclosure describes a multiaxis gyroscope comprising a first proof mass quartet centered around a first quartet center point and a second proof mass quartet centered around a second quartet center point. The phase of the primary oscillation of each proof mass in the first proof mass quartet in relation to the first quartet center point is anti-phase in relation to the phase of the primary oscillation of the corresponding proof mass in the second proof mass quartet in relation to the second quartet center point. The phase of the primary oscillation of the first and second proof masses in each proof mass quartet in relation to the corresponding quartet center point is anti-phase in relation to the phase of the primary oscillation of the third and fourth proof masses in the same proof mass quartet in relation to the same quartet center point.

2 Claims, 15 Drawing Sheets

(56) References Cited

U.S. PATENT DOCUMENTS

| | | |
|---|---|---|
| 2008/0115579 A1 | 5/2008 | Seeger et al. |
| 2009/0100930 A1 | 4/2009 | Coronato et al. |
| 2010/0126269 A1 | 5/2010 | Coronato et al. |
| 2010/0126272 A1 | 5/2010 | Coronato et al. |
| 2010/0236327 A1 | 9/2010 | Mao |
| 2010/0263446 A1 | 10/2010 | Tamura et al. |
| 2011/0041609 A1 | 2/2011 | Clark et al. |
| 2011/0094301 A1 | 4/2011 | Rocchi |
| 2012/0006123 A1 | 1/2012 | Walther et al. |
| 2012/0024056 A1 | 2/2012 | Hammer |
| 2012/0048017 A1 | 3/2012 | Kempe |
| 2012/0055248 A1 | 3/2012 | Hammer |
| 2012/0060604 A1 | 3/2012 | Neul et al. |
| 2012/0279300 A1 | 11/2012 | Walther |
| 2013/0167636 A1 | 7/2013 | Coronato et al. |
| 2013/0192363 A1 | 8/2013 | Loreck et al. |
| 2014/0182375 A1 | 7/2014 | Kim et al. |
| 2014/0352431 A1 | 12/2014 | Leclerc |
| 2015/0033850 A1 | 2/2015 | Jeung et al. |
| 2015/0033852 A1 | 2/2015 | Kim et al. |
| 2015/0128700 A1 | 5/2015 | Neul |
| 2015/0168441 A1 | 6/2015 | Hutchison et al. |
| 2015/0377624 A1 | 12/2015 | Falorni et al. |
| 2016/0178374 A1 | 6/2016 | Kempe |
| 2016/0231114 A1 | 8/2016 | Kim et al. |
| 2016/0341552 A1 | 11/2016 | Kub et al. |
| 2017/0227572 A1 | 8/2017 | Malvern |
| 2017/0268879 A1 | 9/2017 | Andersson et al. |
| 2018/0216935 A1 | 8/2018 | Senkal et al. |
| 2018/0231384 A1* | 8/2018 | Johnson ............ G01C 19/5656 |
| 2018/0266821 A1 | 9/2018 | Zhang et al. |
| 2018/0342667 A1 | 11/2018 | Kuisma |
| 2019/0346265 A1 | 11/2019 | Kuisma |

FOREIGN PATENT DOCUMENTS

| | | |
|---|---|---|
| JP | 2012-088119 A | 5/2012 |
| JP | 2013-525777 A | 6/2013 |
| JP | 2014-194423 A | 10/2014 |
| WO | WO 2017/130312 A1 | 8/2017 |

OTHER PUBLICATIONS

European Search Report dated May 14, 2020 corresponding to European Patent Application No. 19 21 1120.
Finnish Search Report dated Jun. 5, 2019 corresponding to Finnish Patent Application No. 20186114.
Finnish Search Report dated May 31, 2019 corresponding to Finnish Patent Application No. 20186113.

* cited by examiner

| 11 | ⇨ | primary mode |
| 12 | ➡ | secondary mode in z-axis rotation |
| 13 | ⊕ ⊙ | secondary mode in x-axis rotation |
| 14 | ⊗ ⊙ | secondary mode in y-axis rotation |
Figure 1
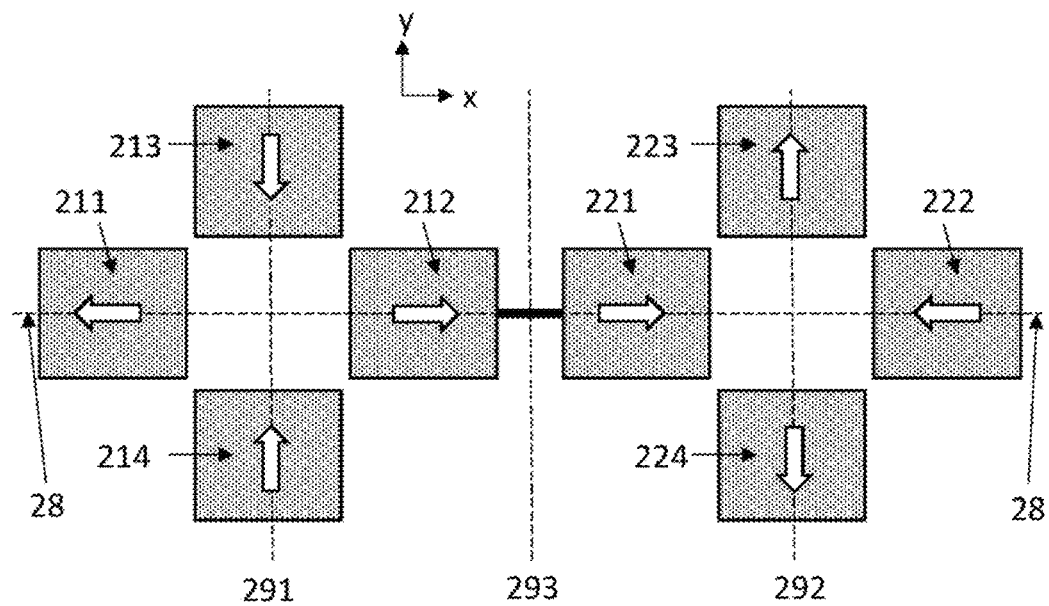
Figure 2a
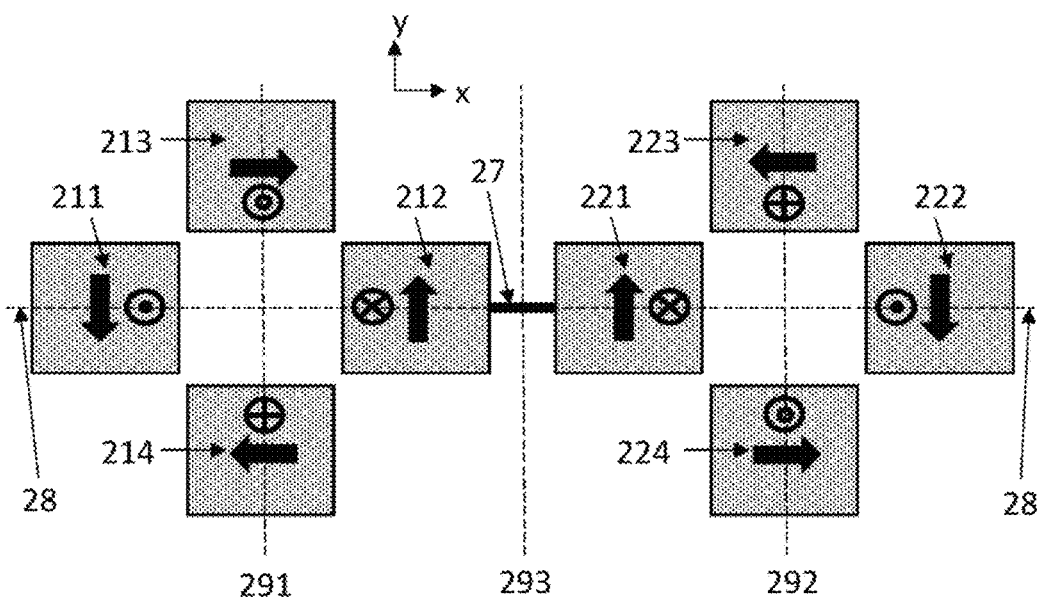
Figure 2b

VIBRATION-ROBUST MULTIAXIS GYROSCOPE

FIELD OF THE DISCLOSURE

This disclosure relates to microelectromechanical gyroscopes, and more particularly to multiaxis gyroscopes where the same oscillating proof mass system can be used for measuring angular rotation about one, two or three mutually perpendicular rotations axes.

BACKGROUND OF THE DISCLOSURE

A general problem in microelectromechanical (MEMS) gyroscopes utilizing oscillating proof masses is that the masses should preferably be easily driven into a primary oscillation mode (which may also be called the drive oscillation mode) by drive actuators and also be easily set into a secondary oscillation mode (which may also be called the sense oscillation mode) by the Coriolis force, but still preferably not be moved by external disturbances. In other words, a gyroscope should preferably be unperturbed by linear and rotational vibrations imparted to it by surrounding elements at frequencies that are above the measurement frequency range, so that its output signal is determined only by the angular rotation rate which the gyroscope undergoes within the intended measurement frequency range. In automotive applications, for example, the disturbing vibrations typically lie in the frequency range 1 . . . 50 kHz, whereas the measurement frequency range is typically below 1 kHz.

A simple MEMS gyroscope may be constructed utilizing only one oscillating proof mass, but its output signal will typically be very noisy if external vibrations are present at a frequency close to the oscillating frequency of the gyroscope. Such a gyroscope is practical only at oscillation frequencies above 50 kHz where the sensitivity of the gyroscope may be very low and other disturbing effects, such as quadrature signals that arise from manufacturing imperfections, may become very prominent. It is known that a proof mass system where two or four proof masses oscillate in anti-phase can be made much more robust than a one-mass gyroscope because signal components arising from vibrations that induce cophasal movement of the two or four proof masses can be automatically cancelled to some degree via differential measurements. Further, if the cophasal resonant frequency can be brought above 50 kHz without affecting the differential resonant frequency, the gyroscope may be very robust to external vibrations since there is no resonance amplification for the disturbing vibrations.

Some MEMS gyroscopes are designed for measuring rotation rate about one axis which is perpendicular to the device substrate. Such gyroscopes may be called z-axis gyroscopes. Other MEMS gyroscopes are designed for measuring rotation rate about either of the two perpendicular axes which lie within the substrate plane. Such gyroscopes may be called x-axis gyroscopes and/or y-axis gyroscopes.

A multi-axis gyroscope can be created by incorporating two or three one-axis gyroscopes for different axes of rotation in the same device. This kind of multi-axis gyroscope will have two or three discrete oscillation frequencies, which will make the design of the electronic circuit difficult in order to avoid interference between the frequencies. Multiple sustaining and stabilizing circuits are then also needed for the primary oscillation. Some multiaxis MEMS gyroscopes are designed for measuring rotation rate about the x-, y-, and/or z-axis with the same set of oscillating proof masses to avoid the possible interference between different frequencies. It is difficult to make multiaxis gyroscopes based on a single oscillation frequency robust against external disturbances because all the proof masses must be given freedom to oscillate in many different directions in order to be free to assume any of the secondary oscillation modes associated with angular rotation about the three mutually orthogonal axes. External vibrations must still be suppressed in the partly flexible suspension and coupling arrangements which attach the proof masses to a fixed structure or cancelled in differential measurements. It is difficult to obtain robustness against external vibrations and isolation of all oscillation modes from energy leakage in multiaxis gyroscopes utilizing two or four proof masses.

Document US2015128700 discloses a multiaxis gyroscope with a proof mass system which utilizes eight masses symmetrically located around a common center so that in a radial configuration four masses are inner masses and four masses are outer masses or, in a stacked configuration, so that four masses are upper masses and four masses are lower masses. In either configuration it is not easy to conceive suspension and coupling arrangements, which would allow all desired oscillation modes and suppress all undesired modes and no such arrangements are presented in US2015128700.

BRIEF DESCRIPTION OF THE DISCLOSURE

An object of this disclosure is to provide an apparatus for alleviating the above disadvantages and present multiaxis gyroscopes with proof mass systems that more efficiently promote desired modes and suppress undesired modes, and also allows the most advantageous operation modes and vibration modes of the proof masses to be used.

The object of the disclosure is achieved by an arrangement which is characterized by what is stated in the independent claims. The preferred embodiments of the disclosure are disclosed in the dependent claims.

The disclosure is based on the idea of utilizing a proof mass system which comprises two adjacent proof mass quartets. The primary oscillation mode is actuated so that each proof mass in a quartet oscillates, in relation to its quartet center point, in anti-phase compared to the corresponding proof mass in the other quartet.

An advantage of the arrangement presented in this disclosure is that oscillation modes can be easily synchronized and suppressed, which makes the gyroscope robust against external vibrations. Side-by-side placement of two proof mass quartets allows easy interconnection between two proof masses in the middle of the gyroscope, which move essentially in-phase in all oscillation modes. Optionally, other proof masses in the proof masses quartets may be interconnected with a see-saw or lever structure, since they move in anti-phase in all oscillation modes.

BRIEF DESCRIPTION OF THE DRAWINGS

In the following the disclosure will be described in greater detail by means of preferred embodiments with reference to the accompanying drawings, in which FIG. 1 illustrates symbols which are used in other figures in this disclosure.

FIGS. 2a-2f illustrate a first example of primary and secondary oscillation modes.

DETAILED DESCRIPTION OF THE DISCLOSURE

Figure 2C:
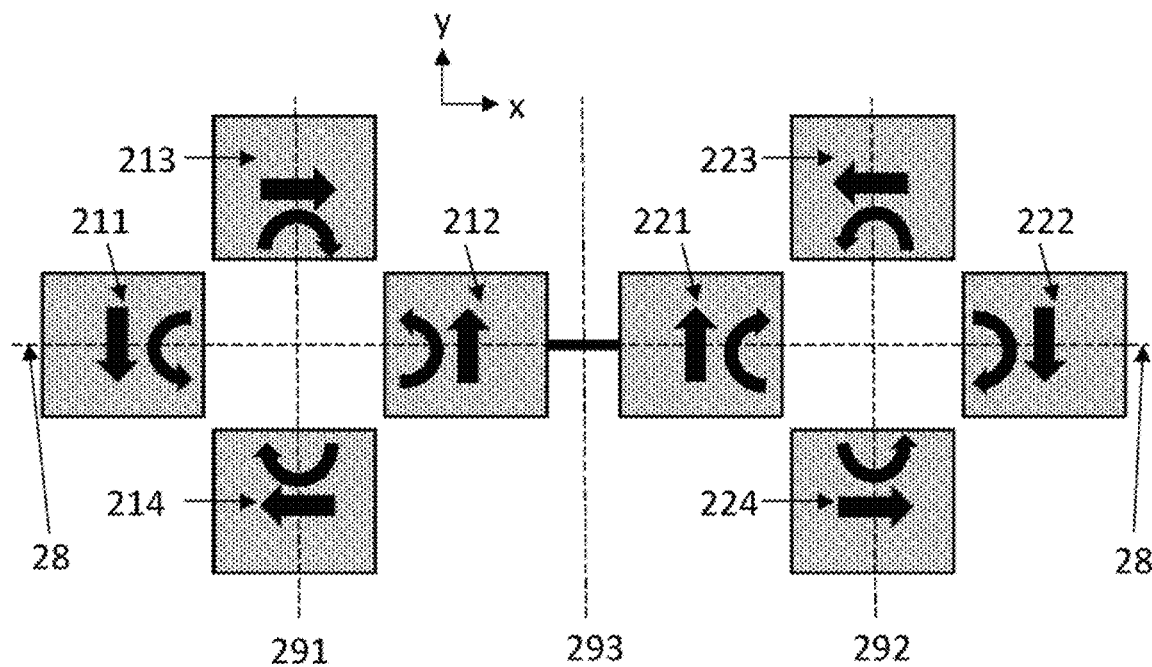

This disclosure describes a microelectromechanical gyroscope which comprises a first proof mass quartet and a second proof mass quartet in a device plane, with a corresponding first quartet center point and a corresponding second quartet center point which lie on a lateral axis.

The four proof masses which form the first proof mass quartet are in their rest position symmetrically arranged around the first quartet center point where the lateral axis crosses a first transversal axis orthogonally in the device plane. The four proof masses which form the second proof mass quartet are in their rest position symmetrically arranged around the second quartet center point where the lateral axis crosses a second transversal axis orthogonally in the device plane.

The first and second proof masses in each proof mass quartet are aligned on the lateral axis in their rest position, and third and fourth proof masses in the first proof mass quartet are aligned on the first transversal axis in their rest position. Third and fourth proof masses in the second proof mass quartet are aligned on the second transversal axis in their rest position, and the rest positions of the first, second, third and fourth proof masses in relation to the corresponding quartet center point are the same in both quartets.

The second proof mass in the first proof mass quartet is adjacent and mechanically coupled to the first proof mass in the second proof mass quartet, The gyroscope further comprises one or more drive transducers for setting the first and second proof mass quartets into primary oscillating motion, and one or more sense transducers for detecting secondary oscillating motion of the first and second proof mass quartets which is induced by the Coriolis force if the gyroscope undergoes angular rotation.

The gyroscope further comprises a suspension arrangement for suspending the first and second proof mass quartets from a fixed support structure. The suspension structure is configured to accommodate the primary and secondary oscillating motion of the first and second proof mass quartets.

The drive transducers are configured to set all four proof masses in each proof mass quartet into primary oscillation in the device plane either in a first primary oscillation mode or in a second primary oscillation mode.

The first primary oscillation mode comprises motion where each proof mass oscillates in a radial direction in relation to the corresponding quartet center point, and the second primary oscillation mode comprises motion where each proof mass oscillates in a tangential direction in relation to the corresponding quartet center point.

The primary oscillation in the first primary oscillation mode is synchronized so that:
  each proof mass in the first proof mass quartet moves toward the first quartet center point when the corresponding proof mass in the second proof mass quartet moves away from the second quartet center point, and vice versa,
  the first proof mass in each proof mass quartet moves toward the corresponding quartet center point when the second proof mass in the same proof mass quartet moves toward the same quartet center point, and away from the same quartet center point when the second proof mass in the same proof mass quartet moves away from the same quartet center point,
  the third proof mass in each proof mass quartet moves toward the corresponding quartet center point when the fourth proof mass in the same proof mass quartet moves toward the same quartet center point, and away from the same quartet center point when the fourth proof mass in the same proof mass quartet moves away from the same quartet center point, and
  the first and second proof masses in each proof mass quartet move toward the corresponding quartet center point when the third and fourth proof masses in the same proof mass quartet move away from the same quartet center point, and vice versa, The primary oscillation in the second primary oscillation mode is synchronized so that:
  each proof mass in the first proof mass quartet moves clockwise in relation to the first quartet center point when the corresponding proof mass in the second proof mass quartet moves counter-clockwise in relation to the second quartet center point, and vice versa,
  the first proof mass in each proof mass quartet moves clockwise in relation to the corresponding quartet center point when the second proof mass in the same proof mass quartet moves clockwise in relation to the same quartet center point, and counter-clockwise in relation to the same quartet center point when the second proof mass in the same proof mass quartet moves counter-clockwise in relation to the same quartet center point,
  the third proof mass in each proof mass quartet moves clockwise in relation to the corresponding quartet center point when the fourth proof mass in the same proof mass quartet moves clockwise in relation to the same quartet center point, and counter-clockwise in relation to the same quartet center point when the fourth proof mass in the same proof mass quartet moves counter-clockwise in relation the same quartet center point, and
  the first and second proof masses in each proof mass quartet move clockwise in relation to the corresponding quartet center point when the third and fourth proof masses in the same proof mass quartet move counter-clockwise in relation to the same quartet center point, and vice versa, The secondary oscillation modes of the first and second proof mass quartets include a z-axis secondary mode, an x-axis secondary mode, and/or a y-axis secondary mode. If the primary oscillation mode of each proof mass quartet is the first primary oscillation mode, then
  in response to rotation of the gyroscope about the z-axis, the z-axis secondary mode comprises motion where each proof mass in each proof mass quartet oscillates tangentially in relation to the corresponding quartet center point,
  in response to rotation of the gyroscope about an x-axis which is parallel to the lateral axis, the x-axis secondary mode comprises motion where each proof mass pair formed by third and fourth proof masses oscillates out of the device plane, in response to rotation of the gyroscope about the y-axis which is parallel to the first and second transversal axes, the y-axis secondary mode comprises motion where each proof mass pair formed by first and second proof masses oscillates out of the device plane, If the primary oscillation mode of each proof mass quartet is the second primary oscillation mode, then in response to rotation of the gyroscope about the z-axis, the z-axis secondary mode comprises motion where each proof mass oscillates radially in relation to the corresponding quartet center point, in response to rotation of the gyroscope about an x-axis which is parallel to the lateral axis, the x-axis secondary mode comprises motion where each proof mass pair formed by first and second proof masses oscillates out of the device plane, in response to rotation of the gyroscope about the y-axis which is parallel to the first and second transversal axes, the y-axis secondary mode comprises motion where each proof mass pair formed by third and fourth proof masses oscillates out of the device plane.

In this disclosure the device plane is illustrated and referred to as the xy-plane. The z-axis is perpendicular to the xy-plane. Linear and/or rotational motion or a combination thereof where the proof mass remains level in the device plane may referred to as "in-plane" motion or "motion in the device plane", while linear and/or rotational motion or the combination thereof where the proof mass (or its center of gravity) moves in a vertical direction may be referred to as "out-of-plane" motion, or "motion out of the device plane".

In the remaining parts of this disclosure, rotation about an axis parallel to the z-axis will be referred to simply as rotation about the z-axis. Similarly, rotation about an axis parallel to the x-axis will be referred to as rotation about the x-axis, and rotation about an axis parallel to the y-axis will be referred to as rotation about the y-axis.

In this disclosure, "radial" oscillation refers to linear movement in the xy-plane, away from a central point and towards a central point. "Tangential" oscillation refers to movement in the xy-plane, along the tangent or along the perimeter of an imaginary circle centred at a central point.

Tangential oscillation may in practice be a mixture of linear movement and rotation. The suspension arrangement will determine how the proof masses move tangentially. The oscillation amplitudes are typically small compared to the dimensions of the proof masses, which means that tangential oscillation will be substantially linear even when it contains a rotational component. The same consideration also applies to out-of-plane oscillation. This oscillation may be a linear movement or a combination of rotational and linear movement which depends on the suspension arrangement. In a special case, with a unique combination of linear motion and rotation for each proof mass, this oscillation may be a rotary movement of a pair of opposite proof masses about the center point of the quartet.

In the figures of this disclosure which depict the xy-plane, the placement of the proof masses in the first and second proof mass quartets correspond to their rest positions. The oscillation directions of the proof masses in the different embodiments of this disclosure, and the phase relationships between the oscillations, will be illustrated in the xy-plane using the symbols presented in FIG. 1. The white arrow shown on row 11 illustrates the primary oscillation mode which occurs in the device plane. The black arrow on row 12 illustrates the secondary mode which will occur in the device plane when the gyroscope undergoes rotation about the z-axis. In Figures that present an xz- or yz cross section view, black arrows are used to illustrate an out-of-plane mode when the gyroscope undergoes rotation about the x-axis or about the y-axis. The pair of symbols illustrated on row 13 will always be used together in Figures presenting an xy-plane view to illustrate the out-of-plane movement of a pair proof masses when the gyroscope undergoes rotation about the x-axis. The pair of symbols illustrated on row 14 will always be used together in Figures presenting an xy-plane view to illustrate the out-of-plane movement of a pair proof masses when the gyroscope undergoes rotation about the y-axis.

FIG. 2a illustrates a microelectromechanical gyroscope with a first proof mass quartet and a second proof mass quartet.

The gyroscope comprises a first proof mass of the first proof mass quartet 211, a second proof mass of the first proof mass quartet 212, a third proof mass of the first proof mass quartet 213, and a fourth proof mass of the first proof mass quartet 214. The gyroscope also comprises a first proof mass of the second proof mass quartet 221, a second proof mass of the second proof mass quartet 222, a third proof mass of the second proof mass quartet 223, and a fourth proof mass of the second proof mass quartet 224.

The first quartet center point is the point where the lateral axis 28 crosses the first transversal axis 291. The second quartet center point is the point where the lateral axis 28 crosses the second transversal axis 292. A third transversal axis 293 crosses the lateral axis between the second proof mass of the first proof mass quartet 212 and the first proof mass of the second proof mass quartet 221, as illustrated in FIG. 2a. The first transversal axis 291 and the second transversal axis 292 are separated from each other on the lateral axis 28. The second proof mass 212 of the first proof mass quartet and the first proof mass 221 of the second proof mass quartet are positioned between the first and second quartet center points, on opposite sides of the third transversal axis 293.

All proof masses may be suspended from a fixed support by flexible suspension springs (not illustrated in FIG. 2a) which allow oscillating movement. The gyroscope may also comprise capacitive or piezoelectric actuators (not illustrated in FIG. 2a) and a control unit which is configured to apply one or more drive voltage signals to the actuators. The control unit can thereby drive the primary oscillation of the proof masses. When the gyroscope undergoes rotation about the x-, y- or z-axis, the Coriolis force sets at least some proof masses into secondary oscillation.

The gyroscope may further comprise coupling springs which synchronize motion of the proof masses so that the desired oscillation phases, which will be described in more detail below, are obtained. Some proof masses may not be directly connected to actuators. Their primary oscillation may instead be indirectly actuated by coupling springs which transmit the motion of one proof mass the proof mass which is not directly connected to actuators.

The suspension springs may include central suspension arrangements formed near the quartet center points and peripheral suspension arrangements which support the weight of the proof masses closer to the periphery of the gyroscope. Any central and peripheral suspenders which flexibly allow the desired oscillation modes can be used, and their shape may depend on the shape of the proof masses. Exemplary suspension arrangements will be illustrated below.

Oscillation Mode Examples

FIGS. 2a and 2b illustrate a first oscillation mode example. In the illustrated example, the primary oscillation mode of each proof mass quartet is the first primary oscillation mode. In other words, each proof mass moves linearly in a radial direction in relation to the corresponding quartet center point.

Each proof mass in the first proof mass quartet (211, 212, 213, 214) moves toward the first quartet center point when the corresponding proof mass in the second proof mass quartet (221, 222, 223 and 224, respectively) moves away from the second quartet center point, and vice versa, The first proof mass in each proof mass quartet (211, 221) moves toward the corresponding quartet center point when the second proof mass in the same proof mass quartet (212, 222) moves toward the same quartet center point, and the first proof mass (211, 221) moves away from the same quartet center point when the second proof mass (212, 222) in the same proof mass quartet moves away from the same quartet center point.

The third proof mass in each proof mass quartet (213, 223) moves toward the corresponding quartet center point when the fourth proof mass in the same proof mass quartet (214, 224) moves toward the same quartet center point, and the third proof mass (213, 223) moves away from the same quartet center point when the fourth proof mass (214, 224) in the same proof mass quartet moves away from the same quartet center point.

The first and second proof masses (211+221, 221+222) in each proof mass quartet move toward the corresponding quartet center point when the third and fourth proof masses in the same proof mass quartet (213+214, 223+224) move away from the same quartet center point, and vice versa.

As shown in FIG. 2*a*, the primary oscillation of the proof mass 211 is in opposite phase to the oscillation of the proof mass 212 and the oscillation of the proof mass 213 is in the opposite phase to the oscillation of the proof mass 214. So proof masses 211 and 212 move simultaneously away from the first quartet center point, and proof masses 213 and 212 move simultaneously toward the first quartet center point. In other words, for any given proof mass pair discussed in this disclosure the term "opposite phase" means that during the same oscillation half-cycle, the paired proof masses move in opposite directions along the same axis. In cases where the proof mass pair being discussed comprises masses aligned on different transversal axes (one on the first transversal axis and the other on the second transversal axis), the term "opposite phase" will also be used to indicate movement in opposite transversal directions (but along different transversal axes).

Furthermore, the oscillation of proof masses 211 and 212 is in opposite phase to the oscillation of proof masses 213 and 214 in relation to the quartet center point, because the first and second proof masses 211 and 212 move toward the first quartet center point when the third and fourth proof masses move away from the same quartet center point, and vice versa. Here opposite phase in relation to the quartet center point means that during the same oscillation half-cycle the proof masses of one pair move towards the quartet center point while the proof masses of the other pair move away from the quartet center point.

Similar conditions apply for the proof mass pairs 221+222 and 223+224 of the second quartet. In other words, in the first primary oscillation mode each proof mass quartet comprises two proof mass pairs. A proof mass pair is formed by two proof masses on opposite sides of the quartet center point and the two proof masses of each pair oscillate in opposite phase along either the lateral or the second transversal axis. The two proof mass pairs 221+222 and 223+224 oscillate radially in opposite phase in relation to the second quartet center point.

Opposite phase oscillation may also be called anti-phase oscillation in this disclosure.

As shown in FIG. 2*a*, the primary oscillation mode of the two proof mass quartets is synchronized so that the phase of the primary oscillation of each proof mass in the first proof mass quartet is opposite to the phase of the primary oscillation of the corresponding proof mass in the second proof mass quartet. In other words, in the illustrated oscillation half-cycle of oscillation, the first proof mass 211 of the first proof mass quartet moves away from the first quartet center point as the first proof mass 221 of the second proof mass quartet moves toward the second quartet center point. In the next phase, the movements of these two proof masses will be in the opposite directions. The same considerations apply to every pair of corresponding proof masses in the proof mass quartets: 212+222, 213+223 and 214+224.

Alternatively, if the quartet center points were to be taken as phase reference points also for each proof mass pair, it may be said in FIG. 2*a* that the primary oscillation of the first proof mass in each proof mass quartet is radially cophasal with the primary oscillation of the second proof mass in the same proof mass quartet, and the phase of the primary oscillation of the third proof mass in each proof mass quartet is radially cophasal with the primary oscillation of the fourth proof mass in the same proof mass quartet. The phase of the primary oscillation of the first and second proof masses in each proof mass quartet in relation to the corresponding quartet center point could then also be described as radially anti-phasal to the primary oscillation of the third and fourth proof masses in the same proof mass quartet. However, this optional description of the illustrated phases will not be pursued further.

FIG. 2*b* illustrates the corresponding secondary oscillation modes. In response to rotation of the gyroscope about the z-axis, the Coriolis force will oscillate all proof masses tangentially. The first primary oscillation mode then induces a corresponding secondary oscillation mode where each proof mass within a proof mass pair oscillates in antiphase to the other proof mass of the pair. In this case, antiphase means that when one proof mass of a pair moves in a first lateral direction or in a first transversal direction, the other moves in an opposite lateral or transversal direction and both move in the same tangential direction (clockwise or counter-clockwise) in relation to their corresponding quartet center points. Within each proof mass quartet, one pair of proof masses (for example 211+212) oscillates in antiphase to the other pair (213+214) in the quartet. Antiphase oscillation within a proof mass quartet means that if one pair moves tangentially clockwise during a half-cycle, the other moves counter-clockwise.

Finally, the first proof mass 211 of the first proof mass quartet and the first proof mass 221 of the second proof mass quartet move in opposite tangential directions (clockwise or counter-clockwise) in relation to their corresponding quartet center points, as illustrated in FIG. 2*b*. The same situation again obtains for all the corresponding proof mass pairs in the two proof mass quartets: 212+222, 213+223 and 214+224. A connection element 27 which connects proof masses 212 and 221 may synchronize the z-axis secondary oscillation modes of the two proof mass quartets with each other.

Capacitive or piezoelectric measurement transducers may be used to determine in-plane oscillation amplitudes in the z-axis secondary oscillation mode. Differential measurement of electrical signals from similar transducers attached to each proof mass can be used for cancelling errors and cross talk. In the following example of differential signal processing, rotational symmetry of proof mass-transducer geometry within a quartet is assumed (proof mass-transducers systems are copied, shifted and rotated) and the electrical signals from the transducers are designated by the symbols of the corresponding proof masses. Within one quartet signals that are in same phase can be summed: 211+212 and 213+214, and a difference of these two can be taken since they are in anti-phase: 211+212−213−214. Since the two quartets are in anti-phase, a difference of corresponding expressions can be taken leading finally to the total signal 211+212−213−214−221−222+223+224. It must be noted that to each proof mass a second transducer with opposite electrical polarity can be easily added. This allows increasing one additional level to the differential compensation. Also, it is possible to use a single transducer with opposite electrical polarity for any proof mass and the sign of the signal in the expression must be then changed accordingly.

In response to rotation of the gyroscope about the x-axis, the Coriolis force will oscillate the proof mass pairs (213+214 and 223+224) formed by the third and fourth proof masses in each proof mass quartet out of the device plane as illustrated in FIG. 2b. These proof mass pairs are joined to each other by central and/or peripheral suspension and coupling springs. These springs are not illustrated in FIG. 2b for clarity but will be discussed below under the heading Suspension and Coupling Examples. Again, due to the anti-phase primary oscillation, proof mass pairs 213+214 and 223+224 will oscillate about the lateral axis 28 in anti-phase.

In response to rotation of the gyroscope about the y-axis, the Coriolis force will oscillate the proof mass pairs (211+212 and 221+222) formed by the first and second proof masses in each proof mass quartet out of the device plane as illustrated in FIG. 2b. Again, these proof mass pairs are joined to each other by central and/or peripheral suspension and coupling springs which are not illustrated in FIG. 2b for clarity reasons. As before, due to the anti-phase primary oscillation, proof mass pairs 211+212 and 221+222 will oscillate about the respective transversal axes in anti-phase. The connection element 27 which connects proof masses 212 and 221 may also synchronize the x-axis secondary oscillation modes of the two proof mass quartets with each other.

Capacitive or piezoelectric measurement transducers may be used to determine out-of-plane oscillation amplitudes in the x-axis and y-axis secondary oscillation modes. Differential measurement of electrical signals from similar transducers attached to each proof mass can be used for cancelling errors and cross talk. In the following example of differential signal processing the electrical signals from the transducers are designated by the symbols of the corresponding proof masses. Within one quartet signals that are in opposite phase can be differenced: 211−212 and 221−222. Since the two quartets are in anti-phase, a difference of corresponding expressions can be taken leading finally to the total signal 211−212−221+222 for detecting the signal produced by y-axis rotation. For x-axis a similar expression can be formed: 213−214−223+224. It must be noted that to each proof mass a second transducer with opposite electrical polarity can be added. This allows increasing one additional level to the differential compensation. Also, it is possible to use a single transducer with opposite electrical polarity for any proof mass and the sign of the signal in the expression must be then changed accordingly.

Figure 2D:
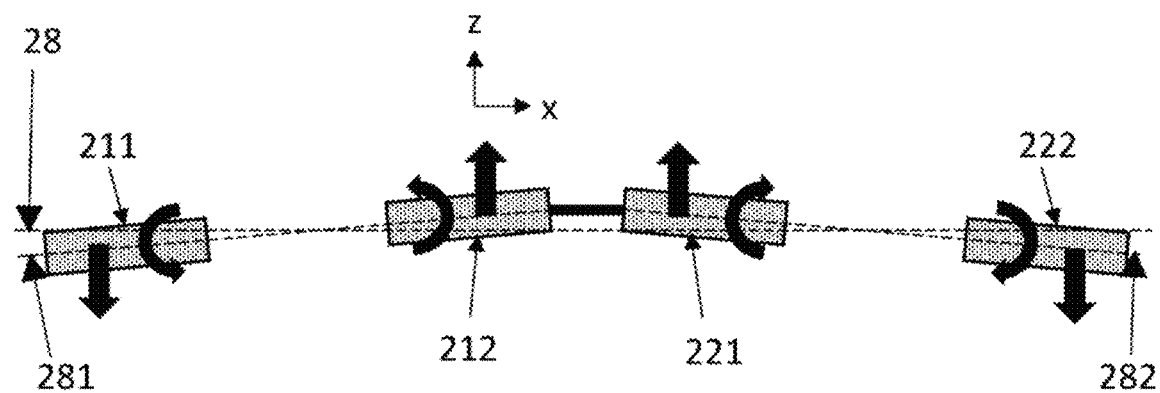
Figure 2E:
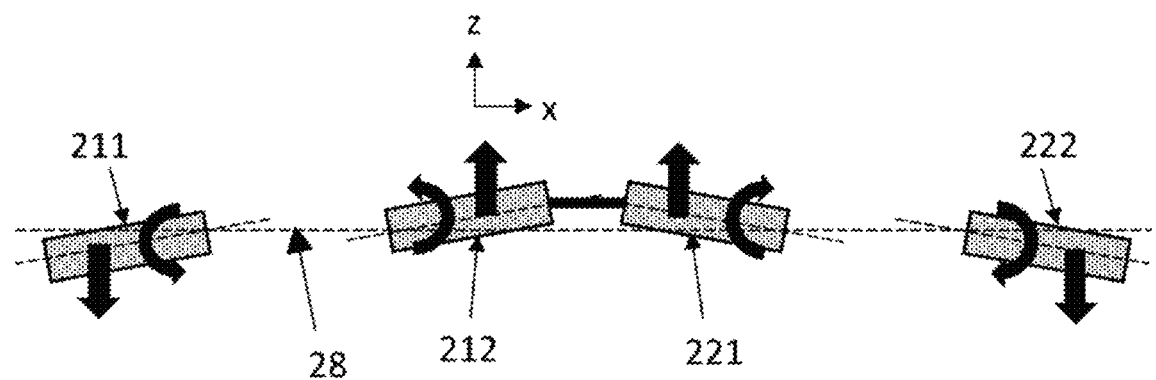
Figure 2F:
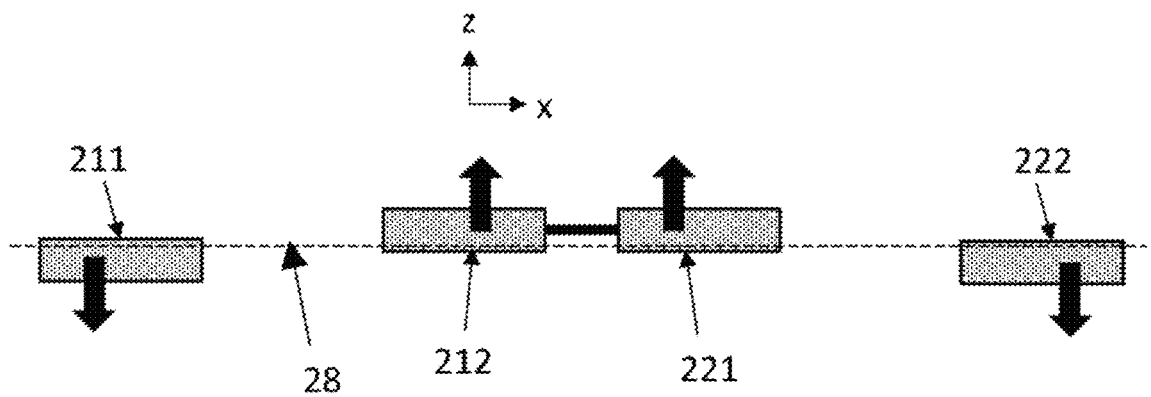

FIG. 2c illustrates tangential in-plane oscillation as a mixture of linear movement and rotation. FIG. 2d illustrates out-of-plane oscillation as a mixture of linear movement and rotation. The suspension arrangement and couplings between proof masses, which will be discussed in more detail below, will determine to which degree the rotational component will be present; in any case the linear movement will predominate. It may be advantageous to have a combination of linear and rotational movement that produces a circular planetary movement of the proof mass around the center of the quartet, as illustrated in FIG. 2d where each proof mass pair 211+212 and 221+222 remains in the same plane (illustrated by axes 281 and 282, respectively) in out-of-plane oscillation. But it is also acceptable to have the rotation center of each proof mass close to the edge of the mass nearest to the center of the quartet, as illustrated in FIG. 2e where the proof mass pairs do not remain in the same plane in out-of-plane oscillation. FIG. 2f illustrates fully linear out-of-plane oscillation. These considerations on linear and rotational oscillation apply to all tangential and out-of-plane oscillation modes discussed in this disclosure, because any one of them may be either linear, or a mixture of linear and rotational movement.

It is evident from FIGS. 2d-2f that the in-plane oscillations that were described above with reference to FIGS. 2a-2c do not strictly speaking always occur within the device plane. If the gyroscope simultaneously undergoes angular rotation about both the z-axis and the y-axis, for example, then in-plane radial or tangential movement may involve some out-of-plane movement because the proof mass plane tilts with respect to the xy-plane, as in FIG. 2d for example. However, in accordance with standard practice in MEMS publications, the in-plane and out-of-plane modes are for clarity reasons kept conceptually separated in this disclosure.

Figure 3A:
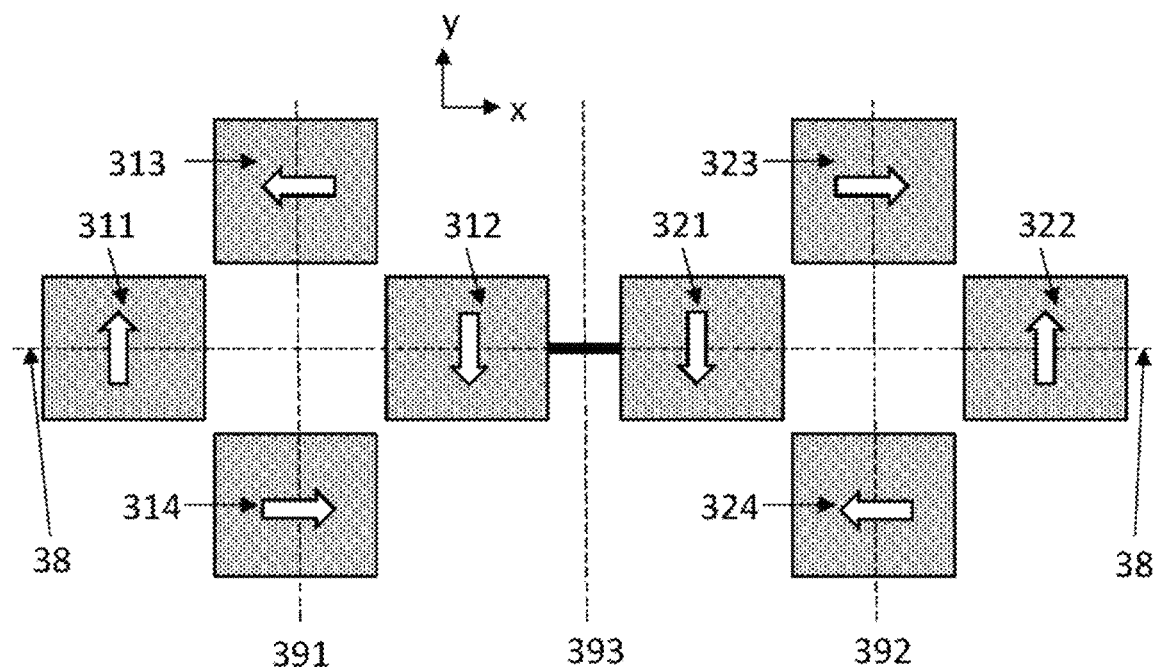
FIGS. 3a-3b illustrate a second example of primary and secondary oscillation modes.
Figure 3B:
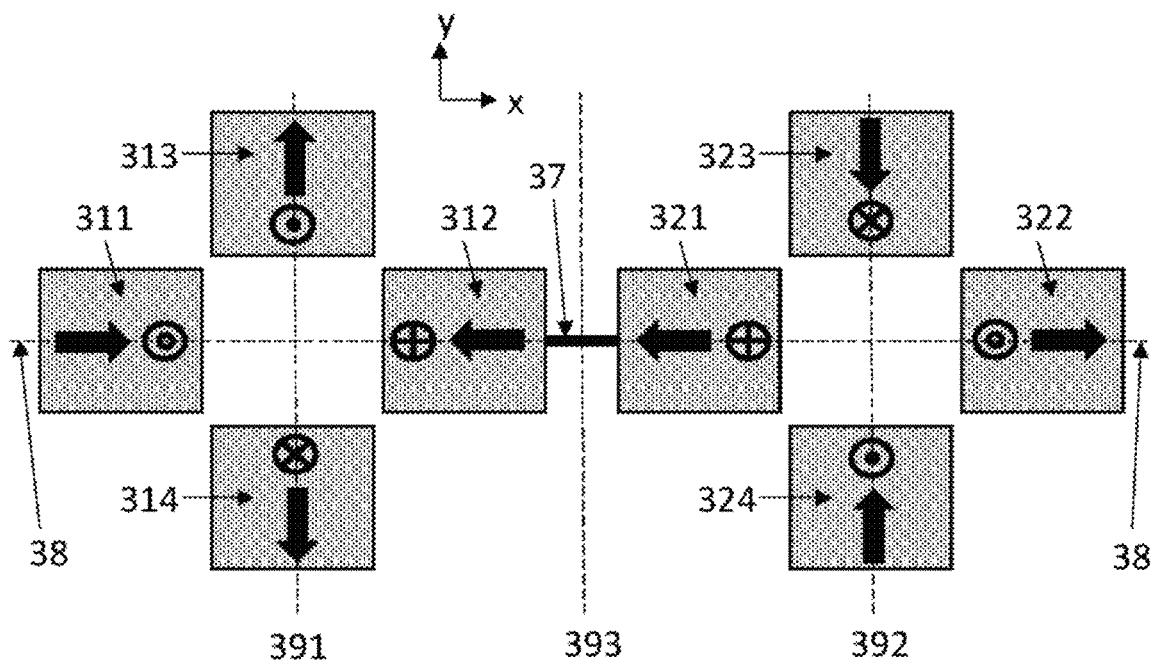

FIGS. 3a and 3b illustrate a second oscillation mode example. Reference numbers 311-314, 321-324, 38 and 391-393 correspond to reference numbers 211-214, 221-224, 28 and 291-293, respectively, in FIGS. 2a and 2b.

In the illustrated example, the primary oscillation mode of each proof mass quartet is the second primary oscillation mode. In other words, each proof mass moves tangentially in relation to the corresponding quartet center point.

Each proof mass in the first proof mass quartet (311, 312, 313 and 314) moves clockwise in relation to the first quartet center point when the corresponding proof mass in the second proof mass quartet (321, 322, 323 and 324, respectively) moves counter-clockwise in relation to the second quartet center point, and vice versa.

The first proof mass (311, 321) in each proof mass quartet moves clockwise in relation to the corresponding quartet center point when the second proof mass in the same proof mass quartet (312, 322) moves clockwise in relation to the same quartet center point, and the first proof mass (311, 321) moves counter-clockwise in relation to the same quartet center point when the second proof mass (312, 322) counter-clockwise in relation to the same quartet center point.

The third proof mass in each proof mass quartet (313, 323) moves clockwise in relation to the corresponding quartet center point when the fourth proof mass in the same proof mass quartet (314, 324) moves clockwise in relation to the same quartet center point, and the third proof mass (313, 323) moves counter-clockwise in relation to the same quartet center point when the fourth proof mass (314, 324) moves counter-clockwise in relation the same quartet center point.

The first and second proof masses in each proof mass quartet (311+312, 321+322) move clockwise in relation to the corresponding quartet center point when the third and fourth proof masses in the same proof mass quartet (313+314, 323+324) move counter-clockwise in relation to the same quartet center point, and vice versa.

The phase of the primary oscillation of the first proof mass in each proof mass quartet (311, 321) in relation to the corresponding quartet center point is opposite to the phase of the primary oscillation of the second proof mass (312, 322) in the same proof mass quartet. As above, opposite phase means that during a half-cycle of oscillation one proof mass moves in a first transversal direction whereas the other moves in the opposite transversal direction. Both masses move in the same tangential direction (clockwise or counter-clockwise) in relation to their corresponding quartet center points. The phase of the primary oscillation of the third proof mass in each proof mass quartet (313, 323) is opposite to the phase of the primary oscillation of the fourth proof mass (314, 324) in the same proof mass quartet. Opposite phase means that during a half-cycle of oscillation one proof mass moves in a first lateral direction whereas the other moves in the opposite lateral direction, and both move in the same tangential direction (clockwise or counter-clockwise) in relation to their corresponding quartet center points.

And finally, the phase of the primary oscillation of the first and second proof masses in each proof mass quartet (311+312, 321+322) in relation to the corresponding quartet center point is anti-phase in relation to the phase of the primary oscillation of the third and fourth proof masses in the same proof mass quartet (313+314, 323+324, respectively) in relation to the same quartet center point. Anti-phase in relation to the quartet center point means that during a half-cycle of oscillation, the proof masses of one pair move tangentially in the opposite direction (clockwise or counter-clockwise) than the proof masses of the other pair.

As shown in FIG. 3a, the primary oscillation mode of the two proof mass quartets is synchronized so that the phase of the primary oscillation of each proof mass in the first proof mass quartet is anti-phase in relation to the phase of the primary oscillation of the corresponding proof mass in the second proof mass quartet. In other words, in the illustrated oscillation phase, the first proof mass 311 of the first proof mass quartet moves clockwise as the first proof mass 321 of the second proof mass quartet moves counter-clockwise. In the opposite phase, the movements of these two proof masses will be in the opposite directions. The same considerations apply to every pair of corresponding proof masses in the proof mass quartets: 312+322, 313+323 and 314+324.

FIG. 3b illustrates the corresponding secondary oscillation modes. In response to rotation of the gyroscope about the z-axis, the Coriolis force will oscillate all proof masses radially. The anti-phase primary oscillation mode induces a corresponding anti-phase secondary oscillation mode where the first proof mass 311 of the first proof mass quartet and the first proof mass 321 of the second proof mass quartet move in opposite radial directions in relation to their corresponding quartet center points, as illustrated in FIG. 3b. The same situation again obtains for all the other proof mass pairs. The connection element 37 which connects proof masses 312 and 321 may synchronize the z-axis secondary oscillation modes of the two proof mass quartets with each other.

Capacitive or piezoelectric measurement transducers may be used to determine in-plane oscillation amplitudes in the z-axis secondary oscillation mode. Differential measurement of electrical signals from similar transducers attached to each proof mass can be used for cancelling errors and cross talk. In the following example of differential signal processing rotational symmetry of proof mass-transducer geometry within a quartet is assumed (proof mass-transducers systems are copied, shifted and rotated) and the electrical signals from the transducers are designated by the symbols of the corresponding proof masses. Within one quartet signals that are in same phase can be summed: 311+312 and 313+314, and a difference of these two can be taken since they are in anti-phase: 311+312−313−314. Since the two quartets are in anti-phase a difference of corresponding expressions can be taken leading finally to the total signal 311+312−313−314−321−322+323+324. It must be noted that to each proof mass a second transducer with opposite electrical polarity can be easily added. This allows increasing one additional level to the differential compensation. Also, it is possible to use a single transducer with opposite electrical polarity for any proof mass and the sign of the signal in the expression must be then changed accordingly.

In response to rotation of the gyroscope about the x-axis, the Coriolis force will oscillate the proof mass pairs (311+312 and 321+322) formed by the first and second proof masses in each proof mass quartet out of the device plane as illustrated in FIG. 3b. The central and/or peripheral suspension and coupling springs which facilitate this oscillation will be illustrated below under the heading Suspension and Coupling Examples. As before, due to the anti-phase primary oscillation, proof mass pairs 311+312 and 321+322 oscillate about their respective transversal axes (391 or 392) in anti-phase. The connection element 37 which connects proof masses 312 and 321 may synchronize the x-axis secondary oscillation modes of the two proof mass quartets with each other.

In response to rotation of the gyroscope about the y-axis, the Coriolis force will oscillate the proof mass pairs (313+314 and 323+324) formed by the third and fourth proof masses in each proof mass quartet out of the device plane, as illustrated in FIG. 3b. Due to the anti-phase primary oscillation, this secondary oscillation about the lateral axis 38 also occurs in anti-phase.

Capacitive or piezoelectric measurement transducers may be used to determine out-of-plane oscillation amplitudes in the x-axis and y-axis secondary oscillation modes. Differential measurement of electrical signals from similar transducers attached to each proof mass can be used for cancelling errors and cross talk. In the following example of differential signal processing the electrical signals from the transducers are designated by the symbols of the corresponding proof masses. Within one quartet signals that are in opposite phase can be differenced: 311−312 and 321−322. Since the two quartets are in anti-phase a difference of corresponding expressions can be taken leading finally to the total signal 311−312−321+322 for detecting the signal produced by x-axis rotation. For y-axis a similar expression can be formed: 313−314−323+324. It must be noted that to each proof mass a second transducer with opposite electrical polarity can be added. This allows increasing one additional level to the differential compensation. Also, it is possible to use a single transducer with opposite electrical polarity for any proof mass and the sign of the signal in the expression must be then changed accordingly.

In combination, the primary and secondary oscillation modes illustrated in FIGS. 2a-2b and 3a-3b make the gyroscope robust against external disturbances and immune to energy flow out of the oscillation mode because the momentum of each moving proof mass one side of the gyroscope is balanced by the opposite momentum of another proof mass on the other side of the gyroscope, and because for the in-plane modes the momentums are balanced already within one quartet of proof masses by the momentum of another proof mass within the quartet. Anti-phase oscillation of the two proof mass pairs (e.g. 211+212 and 213+214) within each quartet also allows advantageous central suspensions to be used, since the volume change produced by this kind of motion in a closed suspension structure is zero in the area close to the center of the quartet.

Proof Mass Quartet Geometries

All proof mass quartets have for illustrative purposes been presented as a collection of four square blocks in FIGS. 2a-3b, with an empty square-shaped area in the middle. It will usually be more advantageous to use a geometry which saves more area.

Figure 4A:
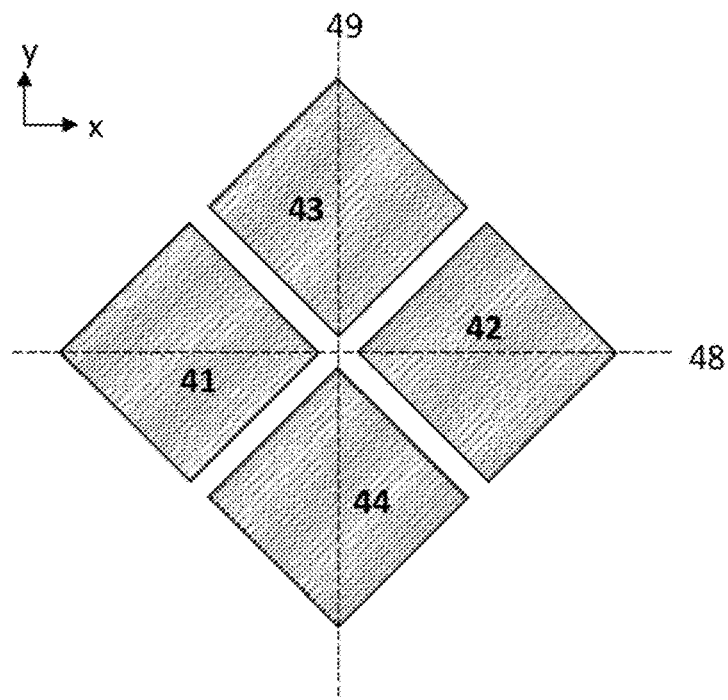
FIGS. 4a-4c illustrate various proof mass quartet geometries.

FIG. 4a illustrates a geometry where square-shaped proof masses 41-44 have been tilted 45 degrees with respect to the lateral axis 48 and transversal axis 49. This allows a denser grouping close to the quartet center point.

Figure 4B:
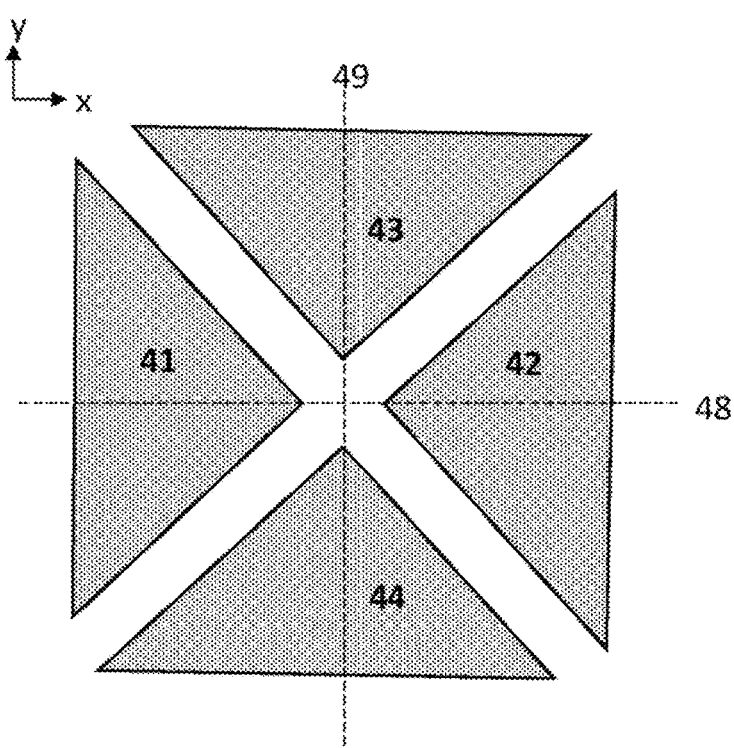

FIG. 4b illustrates another geometry which consumes less surface area. The proof masses 41-44 are shaped as right-angled triangles. More generally, the shape of each proof mass may be an isosceles triangle, and the tip each isosceles triangle may point toward the quartet center point as in FIG. 4b.

Figure 4C:
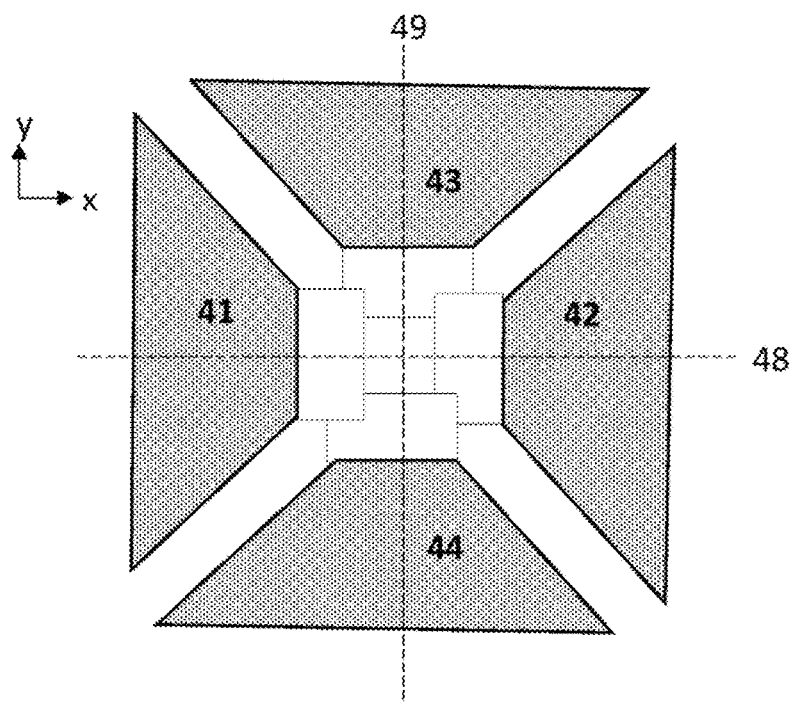

FIG. 4c illustrates a geometry where the proof masses 41-44 are shaped as truncated isosceles (in this case truncated right-angled) triangles where the tip of the triangle has been truncated. This shape can be beneficial if the suspension and coupling arrangements involve some springs which must be placed near the quartet center point.

Any of the geometries illustrated in FIGS. 4a-4c can be used in any embodiment presented in this disclosure. Many other proof mass shapes and arrangements can also be used.

Suspension and Coupling Examples

In general, the term "suspension" refers in this disclosure to an arrangement of one or more flexible springs, which may also be called suspenders, and which extend from a fixed support to a partly mobile element such as a proof mass. The place where the suspender is attached to the fixed support may be called an anchor point. The flexibility of the suspenders renders the proof mass partly mobile, so that they can be set into their primary oscillation mode by drive transducers at or close to the resonant frequency determined by the inertia of the proof mass and compliance of the suspension.

The term "coupling" refers in this disclosure to an arrangement of one or more flexible springs, which may be called coupling springs or synchronization springs, which stabilize the system of oscillating proof masses towards the desired synchronization. Coupling arrangements may also include rigid elements. The coupling function may also be embedded in the suspension and vice versa, the coupling elements may be part of the suspension that determines the resonant frequency. For ease of reference, the general term "suspension arrangement" will in this disclosure cover both suspensions and couplings.

Suspension arrangements should flexibly accommodate, and preferably also synchronize, all the desired primary and secondary oscillation modes of the first and second proof mass quartets. Suspension arrangements should also preferably resist undesired oscillation modes. For every desired anti-phase oscillation mode discussed in this disclosure, there exists a corresponding cophasal oscillation mode which would disturb the measurement if its amplitude and frequency correspond to those of the desired anti-phase oscillation mode. The suspension arrangements should therefore preferably suppress those cophasal oscillation modes. Saying that an undesired movement or oscillation is resisted, prevented or suppressed signifies in this disclosure that the spring constant of the suspension arrangement for the undesired movement or oscillation (e.g. cophasal) is substantially higher than the spring constant of the desired movement or oscillation (e.g. anti-phase) and thus the resonant frequency of the undesired oscillation mode is considerably higher (e.g. above 50 kHz for automotive applications) than that of the desired mode (typically in the 10 . . . 30 kHz range).

1. One Proof Mass Quartet

Internal suspension arrangements for one proof mass quartet, which support the weight of the proof masses but render them partly mobile, and which may also synchronize the oscillation modes within the proof mass quartet, will be discussed first. In a gyroscope comprising two proof mass quartets, both proof mass quartets may be suspended and internally coupled with the same internal suspension arrangement. Both proof mass quartets may in some cases also be suspended and internally coupled with different internal suspension arrangements but achieving perfect symmetry for differential cancellation of errors and synchronization of the oscillations may then be difficult.

Figure 5:
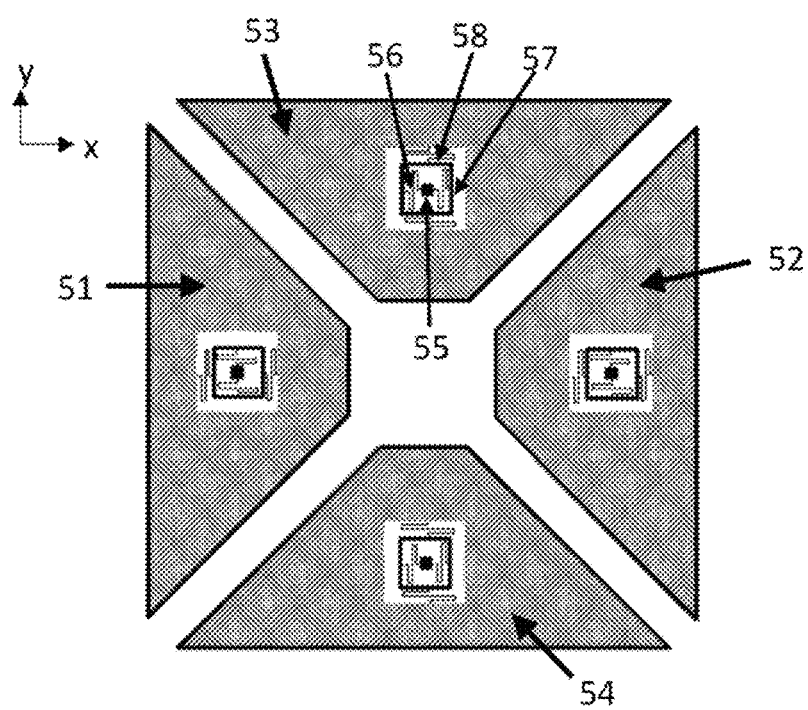
FIGS. 5, 6a-6e and 7a-7b illustrate suspension and coupling examples within a proof mass quartet.

FIG. 5 illustrates an example of a central suspension arrangement which is applicable in all oscillation mode examples presented above. Each proof mass comprises an opening and an anchor point 55 is arranged inside each opening. The suspension arrangement further comprises two inner meander springs 56 which extend from the anchor point to a gimbal frame 57 on opposite sides of the anchor point. The gimbal frame 57 surrounds the anchor point 55 and the inner meander springs 56. Two outer meander springs 58 extend from the gimbal frame to the surrounding proof mass on opposite sides of the gimbal frame 57. The outer meander springs 58 are orthogonal to the inner meander springs 56.

In the proof mass quartet illustrated in FIG. 5, the inner meander springs extend in a transversal direction within the first and second proof masses 51 and 52, while the inner meander springs extend in a lateral direction in third and fourth proof masses 53 and 54. Conversely, the outer meander springs extend in a lateral direction within the first and second proof masses 51 and 52, while the outer meander springs extend in a transversal direction in third and fourth proof masses 53 and 54.

The inner and outer meander springs 56 and 58 allow each proof mass to move in both the lateral and the transversal direction. The folded sections in the inner and outer meander springs 56 and 58 should be sufficiently long to allow also out-of-plane translation and rotation of the proof mass.

Figure 6A:
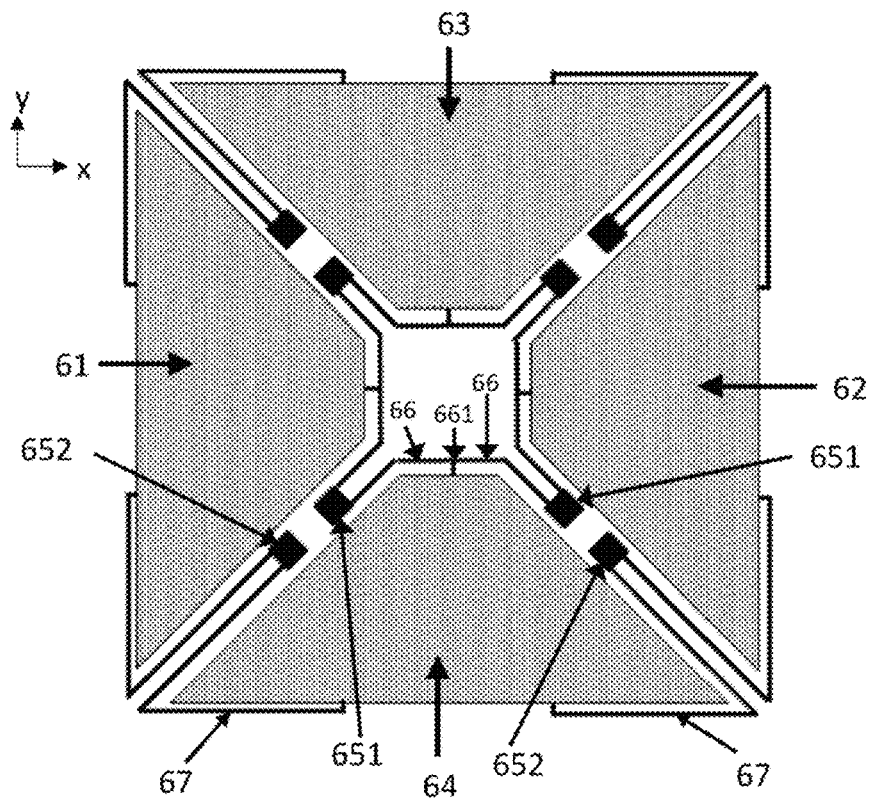

FIG. 6a illustrates an example of a central and peripheral suspension arrangement which is applicable in all oscillation mode examples presented above. The suspension arrangement comprises four inner anchor points 651 and four outer anchor points 652. One inner and one outer anchor point is placed between each pair of adjacent proof masses. The inner and outer anchor points are located on axes which are tilted 45 degrees with respect to the lateral axis and the transversal axis, which have been omitted from the figure for clarity reasons.

One inner suspension spring 66 extends from each inner anchor point 651, toward the central tip of each of the adjacent proof masses. In other words, two inner suspension springs extend away from the inner anchor point towards the center, along the sides of the respective proof masses. Since each proof mass (for example 64 in FIG. 6a) is flanked by two inner anchor points 651, two inner suspension springs 66 meet each other at a meeting point 661, where a short connecting spring attaches them to the tip of the proof mass.

On the outside, one outer suspension spring 67 extends from each outer anchor point 652 to the outer side of each of the adjacent proof masses. In other words, two outer suspension springs extend away from the outer anchor point, along the sides of the respective proof masses. These outer springs may, for example, reach around the corner of the proof mass as illustrated in FIG. 6a. Since each proof mass (for example 64 in FIG. 6a) is flanked by two outer anchor points 652, two outer suspension springs 67 go around the two base corners of the proof mass and are attached to the outer edge of the proof mass 64.

The combined action of inner and outer suspension springs 66 and 67 that have both in-plane and out-of-plane flexibility allows each proof mass to move in lateral, transversal and vertical directions as well as to rotate in both in-plane and out-of-plane directions.

Figure 6B:
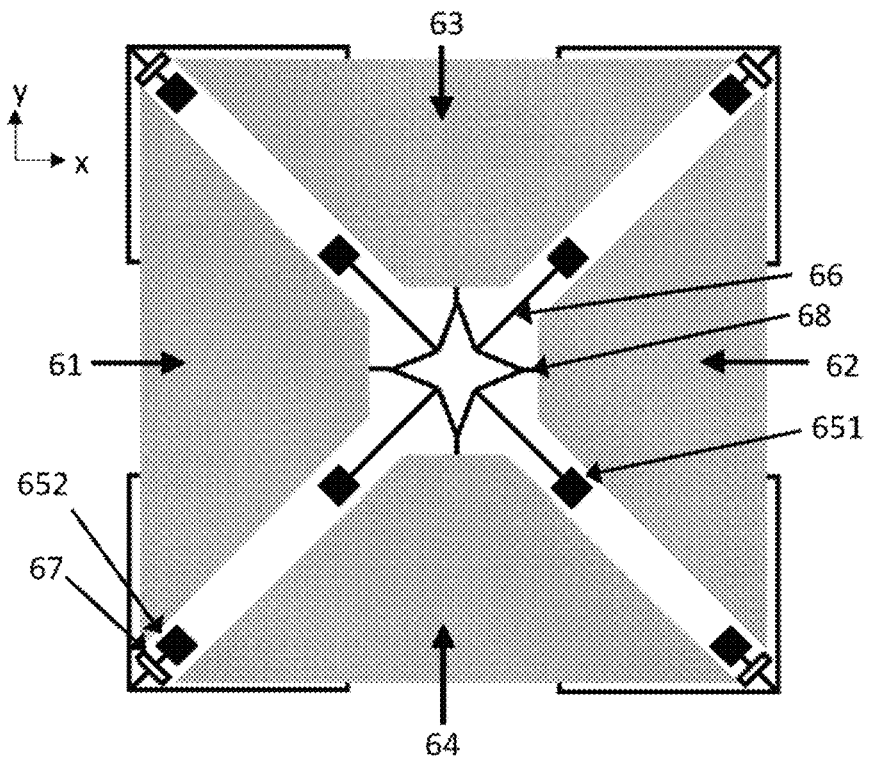
Figure 6C:
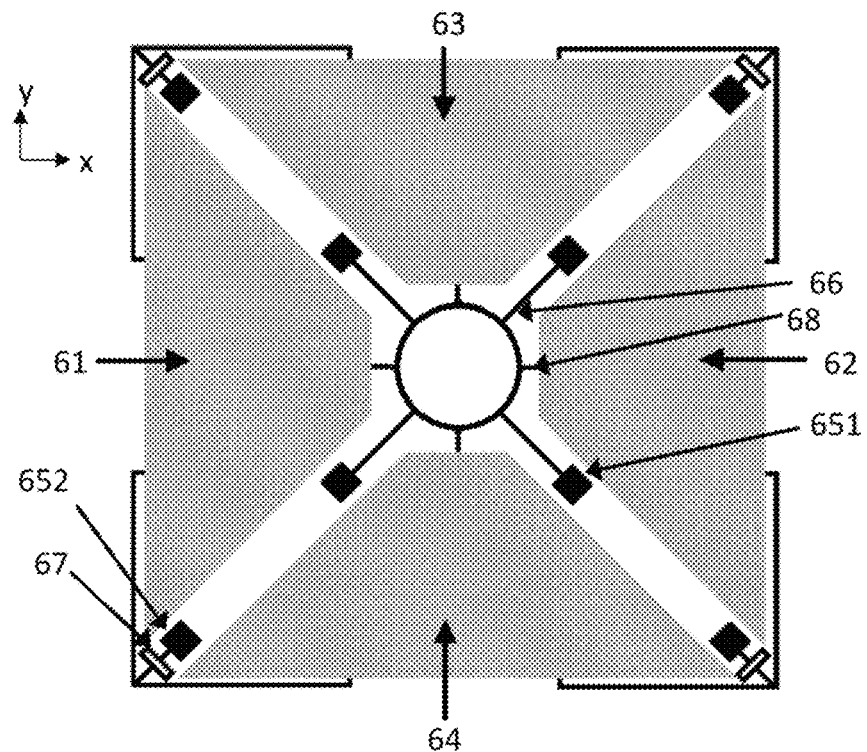

FIGS. 6b, 6c 6d and 6e illustrate alternatives to the central and peripheral suspension arrangement illustrated in FIG. 6a. In the illustrated arrangements, only one inner suspension spring 66 and one outer suspension spring 67 extends away from each inner and outer anchor point, respectively. In FIG. 6b, the inner springs branch out to a four-pointed star-shaped coupling pattern at the center and connect to it at the inner edges of the star. Proof masses are connected to the outer edges of the star by coupling beams 68 that have in-plane flexibility to allow tangential in-plane movement of the proof masses as well as torsional flexibility to allow out-of-plane rotation of the star and a pair of proof masses. For out-of-plane bending the beams 68 are rigid so that a pair of proof masses can essentially rotate around the center of the quartet as illustrated in FIGS. 2d and 2e. The outer springs branch out towards the outer sides of the two adjacent proof masses at each corner of the proof mass quartet.

Figure 6D:
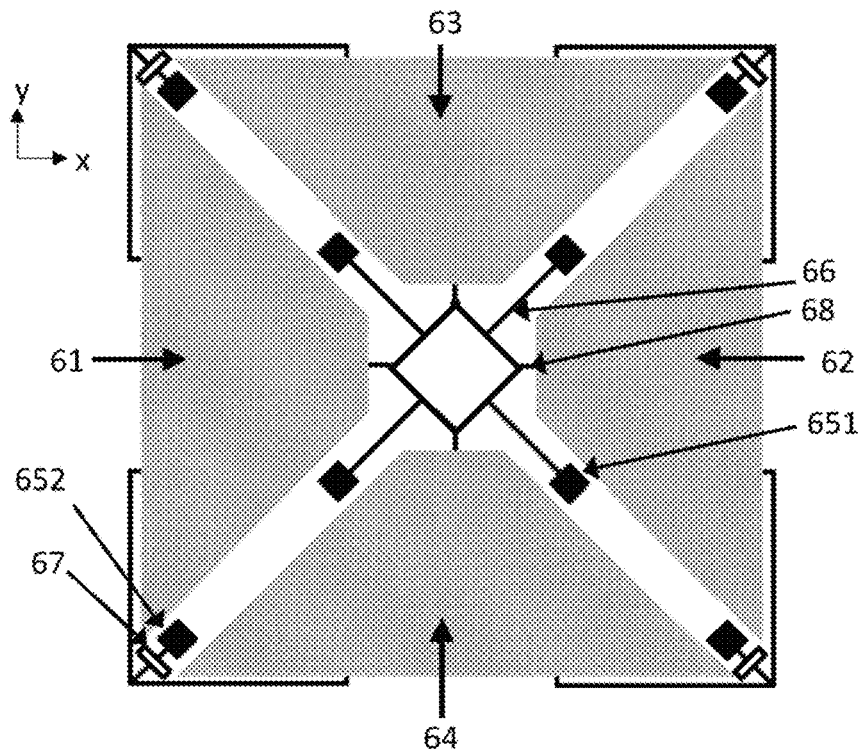

The star-shaped pattern may alternatively be shaped as an octagon or a ring (FIG. 6c), or as a diamond (FIG. 6d). Some or all of the edges of the star-shaped, octagon-shaped or diamond-shaped pattern may be rounded. Any intermediate form between these patterns is also applicable.

Figure 6E:
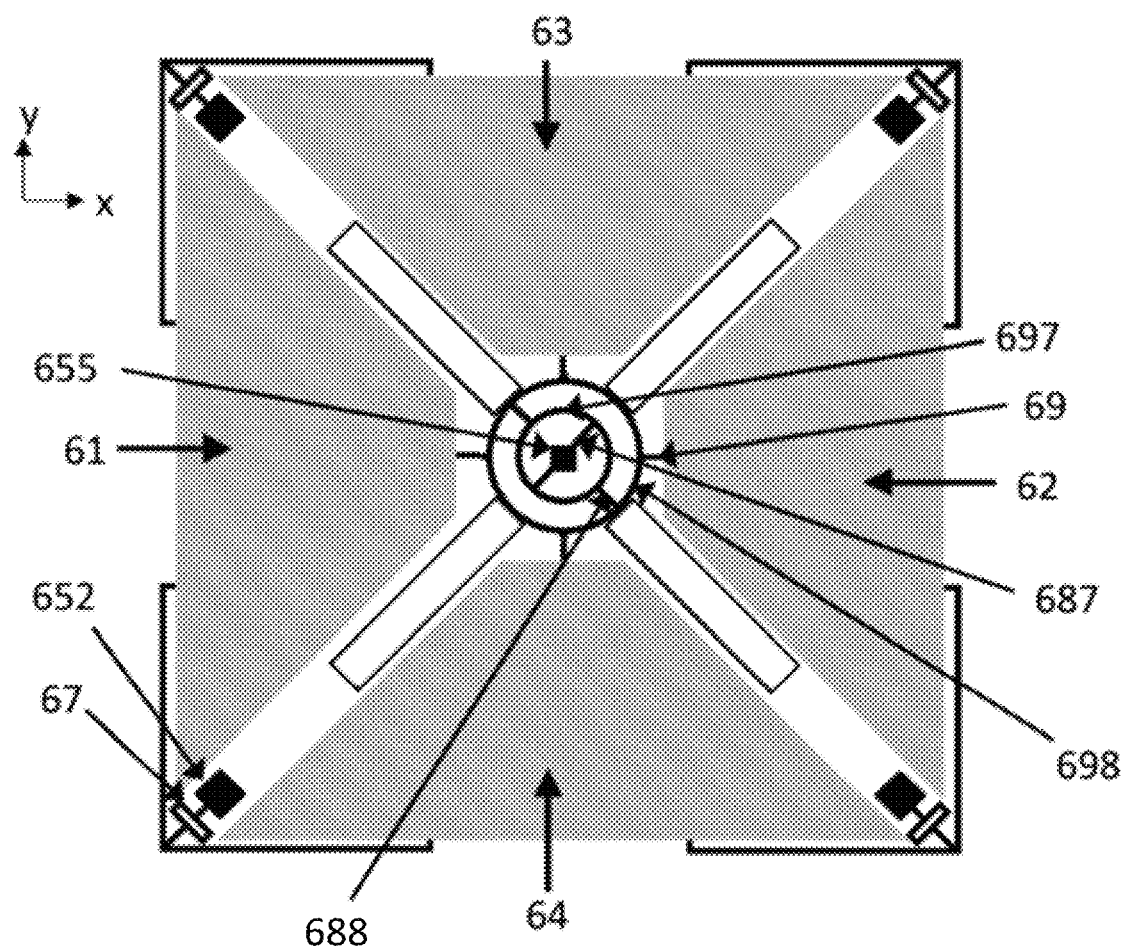

FIG. 6e illustrates another alternative. In this case the central suspension arrangement comprises a central anchor point 655 located at the quartet center point. The central suspension arrangement also comprises a gimbal structure illustrated in FIG. 6e. Two first torsion bars 687 extend diagonally from the central anchor point to an inner gimbal frame 697, and two second torsion bars 688, perpendicular to the first bars 687, extend from the inner gimbal frame 697 to the outer gimbal frame 698. In FIG. 6e, the inner gimbal frame 697 is circular, the outer gimbal frame 698 is circular, and each proof mass in the corresponding proof mass quartet is attached to the outer gimbal frame 698 with an attachment part 69. The outer gimbal frame 698 can assume an elliptical shape along either of the transversal and lateral axes to accommodate and synchronize the anti-phase in-plane oscillation of the two proof mass pairs. It is possible have more than two gimbal frames or other similar bodies with central anchoring, and an outer synchronization body that will perform the same function as the one presented in FIG. 6e. The direction of the torsion bars 687 and 697 may then be different from FIG. 6e.

In general, the central suspension arrangement can be implemented with any symmetrical closed pattern that will easily contract on one axis with a matching forced expansion on an orthogonal axis so that the net area change of the pattern is essentially zero and there is no linear movement along the diagonal axes rotated 45 degrees from x- and y-axes and going through the center of the quartet.

The suspension arrangement illustrated in FIGS. 6b, 6c, 6d and 6e can be used for the oscillation modes illustrated in FIGS. 2a-2b and 3a-3b. The central suspension will then also synchronize the radial movement of the four proof masses (FIGS. 2a and 3b), while the peripheral suspension will synchronize their tangential movement (FIGS. 2b and 3a). Furthermore, the central suspension arrangement facilitates mutual out-of-plane oscillation of the proof mass pair 61+62 in relation to the transversal axis, and mutual out-of-plane oscillation of the proof mass pair 63+64 in relation to the lateral axis in such a manner that one proof mass pair is not put in motion if the other one oscillates. Still further, the central suspension arrangement will prevent all other radial oscillation modes besides the desired anti-phase radial oscillation of the two orthogonal proof mass pairs 61+62 and 63+64.

Figure 7A:
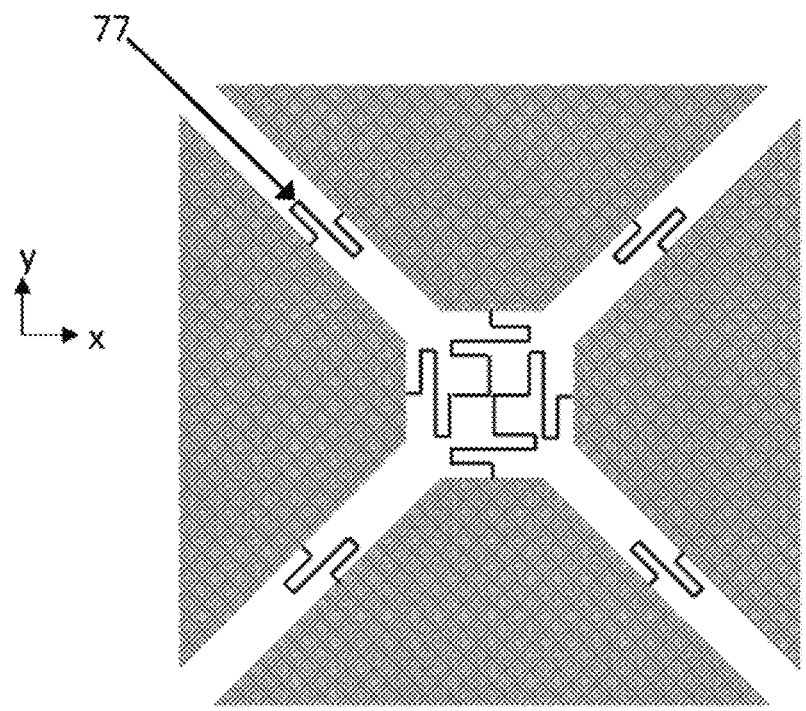

FIG. 7a illustrates additional synchronization springs 77 which may be implemented between adjacent proof masses together with any of the preceding suspension arrangements or with any other suspension arrangements that may be used. However, the suspension arrangements illustrated in FIGS. 6a, 6b, 6c, 6d and 6e may synchronize the oscillation modes sufficiently well even without such additional synchronization springs.

Figure 7B:
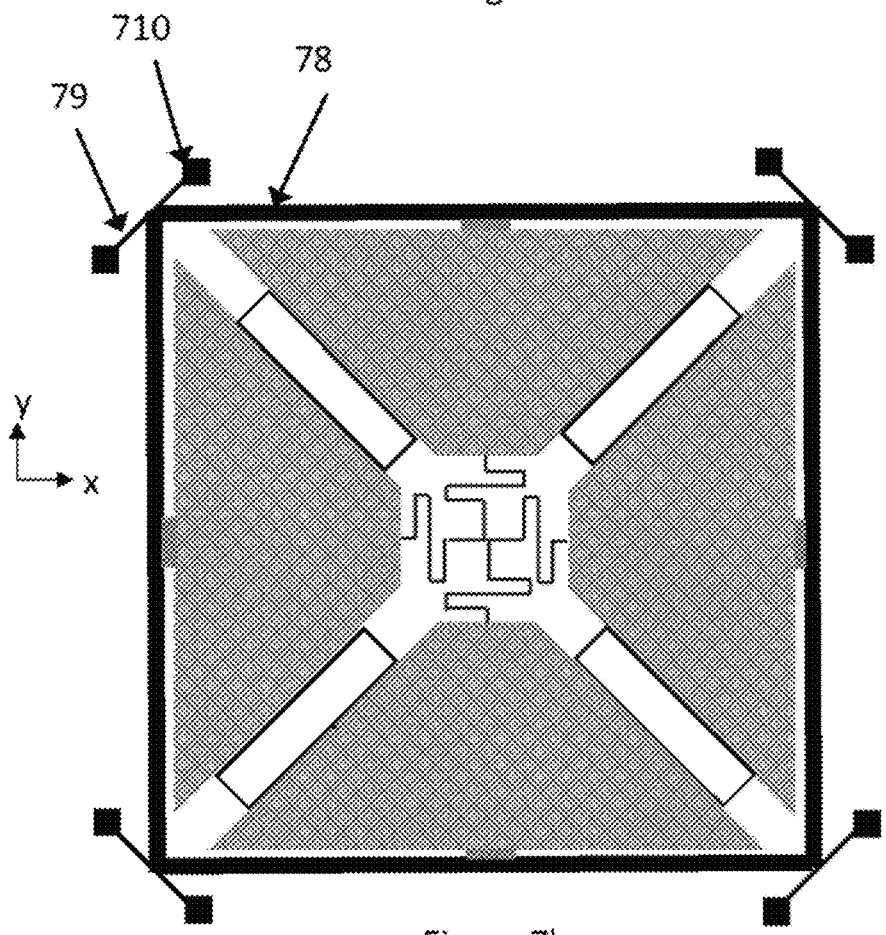

FIG. 7b illustrates yet another possible arrangement for synchronizing the tangential in-plane motion of the proof mass quartet. Each proof mass is suspended with suspenders 78, which may have the required in-plane and out-of-plane flexibility to allow proper resonant frequencies in these directions. The suspenders 78 are connected to diagonal supporting beams 79, which are connected at least at one end to anchor points 710. The proof masses are connected to the mid-point of the suspenders 78. The beams 79 have in-plane flexibility but are rigid for out-of-plane bending. The supporting beams 79 will bend and allow motion when two neighboring proof masses move in the opposite tangential direction, one clockwise and the other counter-clockwise, but they will resist motion when the proof masses try to move in the same tangential direction. Hence, the suspenders 78 and the beam 79 synchronize the anti-phase oscillation of two neighboring proof masses and resist the cophasal oscillation of the same two neighboring proof masses. If similar structures are placed on each corner of the quartet as in FIG. 7b, the in-plane tangential oscillation of all the four proof masses is synchronized to the desired anti-phase mode for each proof mass within a pair of opposite proof masses and for each proof mass pair within the quartet, and all the corresponding cophasal oscillations are prevented.

2. Two Proof Mass Quartets

Figure 8A:
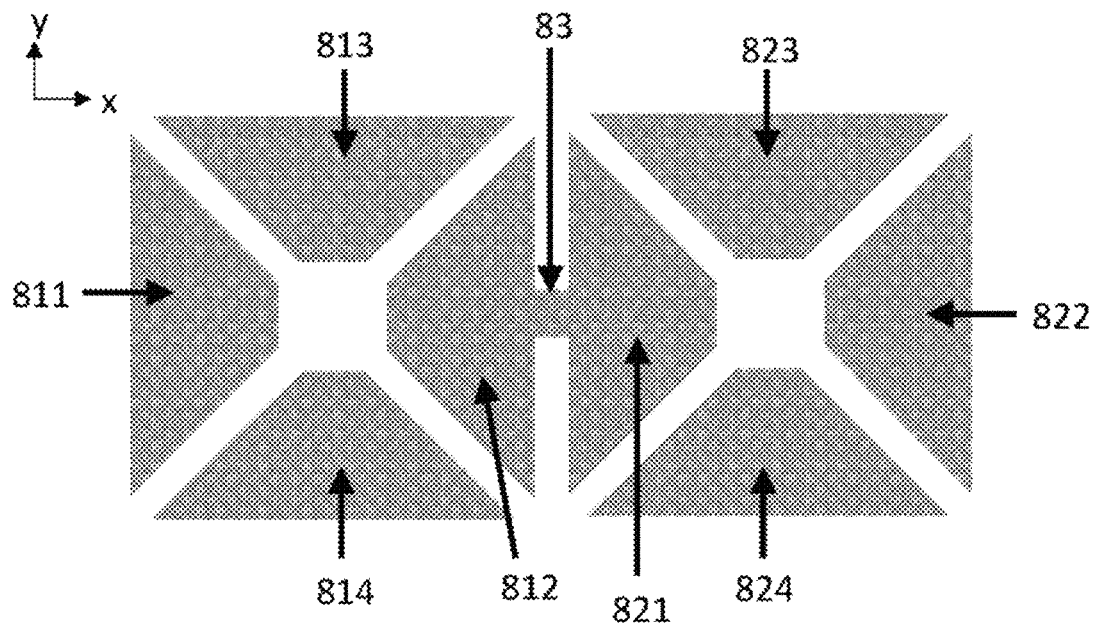
FIGS. 8a-8d and 9 illustrate suspension and coupling examples between two proof mass quartets.

FIG. 8a illustrates one example of a synchronization arrangement between the first proof mass quartet and the second proof mass quartet. Reference numbers 811-814 and 821-824 correspond to reference numbers 211-214 and 221-224, respectively, in FIG. 2a.

The second proof mass 812 in the first proof mass quartet and the first proof mass 821 in the second proof mass quartet are connected to each other with a rigid bar 83. The rigid bar may correspond to connection elements 27 and 37 in FIGS. 2b and 3b, respectively. The rigid bar 83 can be used to synchronize all of the oscillation modes illustrated in FIGS. 2a-3b, since the masses which correspond to 812 and 821 in these figures always move in the same direction. Assuming that the internal synchronization of each proof mass quartet works as desired, the rigid bar will synchronize the entire gyroscope except the out-of-plane movement of proof mass pairs 813+814 and 823+824.

However, the out-of-plane oscillation modes should in this case be linear, not rotational, since rotational oscillation would mean that proof masses 812 and 821 rotate together with their opposing proof mass pair about their respective transversal axes (the first and second transversal axes of the gyroscope). The rigid bar 83 would not allow such rotation, but it does allow simultaneous out-of-plane linear movement of proof masses 812 and 821.

Figure 8B:
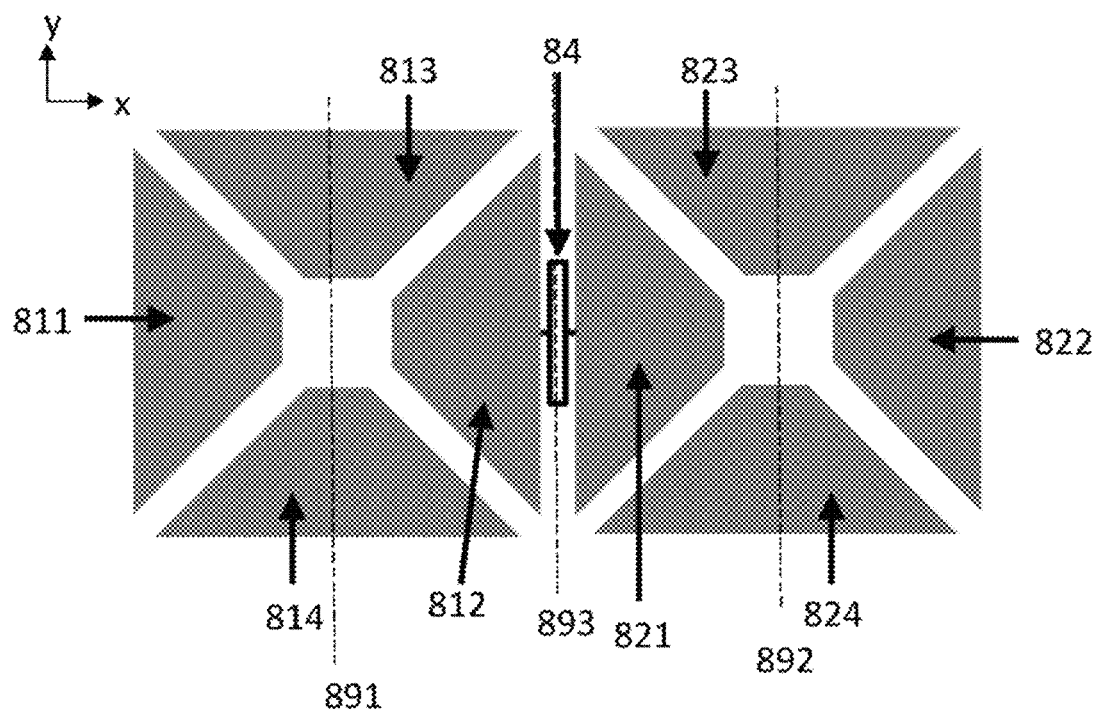

FIG. 8b illustrates an alternative embodiment where a spring 84 has been attached between proof masses 812 and 821. This spring may correspond to connection elements 27 and 37 in FIGS. 2b and 3b, respectively. The spring transfers motion in lateral, transversal and out-of-plane directions from proof mass 812 to 821 and vice versa, so that the primary oscillation mode, the z-axis secondary oscillation mode and one the out-of-plane secondary oscillation modes, namely that of the proof mass pairs 811+812 and 821+822, are effectively synchronized between the first and second proof mass quartets while the movement of proof mass pairs 813+814 and 823+824 is not synchronized. The spring 84 may be relatively rigid for linear movement in the transversal direction, so that the transversal anti-phase movement between 812 and 821 is prevented. The spring 84 may be flexible for rotation about the z-axis allowing an in-plane tilt angle between the proof masses 812 and 821 and thus the desired anti-phase rotation about each proof masses quartet center. The spring may be also flexible for rotation about the third transversal axis 893, so that it allows out-of-plane rotational movement of the proof masses by allowing a tilt angle between them but doesn't allow anti-phase out-of-plane movement between 812 and 821.

Figure 8C:
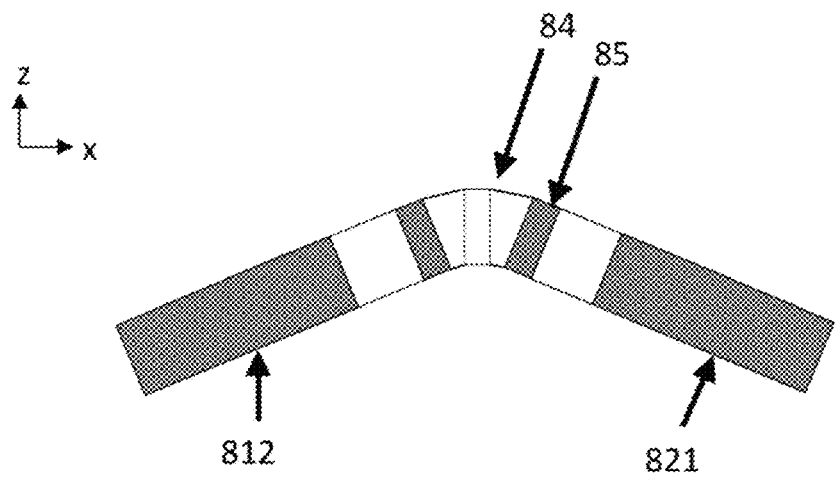
Figure 8D:
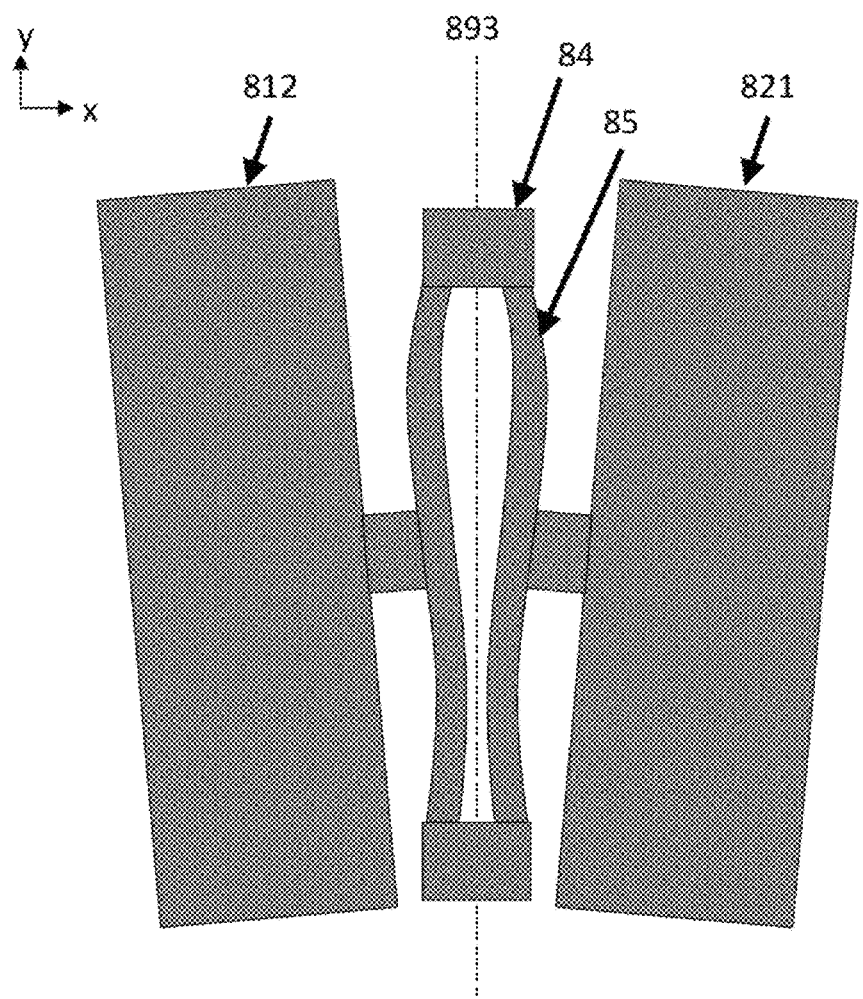

FIGS. 8c and 8d illustrate a possible structure for the spring 84 as a cross section and as an in-plane view, correspondingly. Spring 84 may contain at least one bar 85 in the direction of the transversal axis 893, which has in-plane flexibility and torsional flexibility, but which is rigid for out-of-plane bending. One of the proof masses 812 or 821 is attached to the mid-point of the bar 85 and the other proof mass to the ends of the bar. Preferably the spring 84 is symmetrical containing two bars 85 attached to each other at the ends and to the proof masses at the mid-points. Other spring constructions may also be used.

In general, the second proof mass in the first proof mass quartet may be mechanically coupled to the first proof mass in the second proof mass quartet by at least one coupling spring 84 aligned on the third transversal axis 893 in the device plane.

The at least one coupling spring 84 may allow the second proof mass 812 in the first proof mass quartet and the first proof mass 821 in the second proof mass quartet to simultaneously rotate in opposite out-of-plane directions about corresponding transversal axes. These corresponding transversal axes may be the first and second transversal axes 891 and 892, respectively, so that 812 rotates about the first transversal axis while 821 rotates about the second transversal axis, or they may be transversal axes which pass through the proof masses 812 and 821, respectively.

It may also allow the second proof mass 812 in the first proof mass quartet and the first proof mass 821 in the second proof mass quartet to simultaneously rotate in opposite in-plane directions about corresponding vertical axes. These corresponding vertical axes may be the vertical axes which cross the first and second quartet center points, so that 812 rotates about the vertical axis which crosses the first quartet center point while 821 rotates about the vertical axis which crosses the second quartet center point, or they may be vertical axes which pass through the proof masses 812 and 821, respectively.

The at least one coupling spring 84 may further allow simultaneous cophasal linear translation of the second proof mass 812 in the first proof mass quartet and the first proof mass 821 in the second proof mass quartet in a direction parallel to the lateral axis, parallel to any transversal axis, or parallel to any vertical axis.

The at least one coupling spring 84 may further resist the simultaneous rotation of the second proof mass 812 in the first proof mass quartet and the first proof mass 821 in the second proof mass quartet in the same out-of-plane direction about corresponding transversal axes. These corresponding transversal axes may be the first and second transversal axes, so that 812 rotates about the first transversal axis while 821 rotates about the second transversal axis, or they may be transversal axes which pass through the proof masses 812 and 821, respectively.

The at least one coupling spring 84 may further resist the simultaneous rotation of the second proof mass 812 in the first proof mass quartet and the first proof mass 821 in the second proof mass quartet to the same in-plane direction about corresponding vertical axes. These corresponding vertical axes may be the vertical axes which cross the first and second quartet center points, so that 812 rotates about the vertical axis which crosses the first quartet center point while 821 rotates about the vertical axis which crosses the second quartet center point, or they may be vertical axes which pass through the proof masses 812 and 821, respectively.

The at least one coupling spring 84 may further resist simultaneous anti-phase linear translation of the second proof mass 812 in the first proof mass quartet and the first proof mass 821 in the second proof mass quartet in opposite directions parallel to any transversal axis, or parallel to any vertical axis.

Finally, the at least one coupling spring 84 may also resist simultaneous rotation of the second proof mass in the first proof mass quartet and the first proof mass in the second proof mass quartet in opposite directions about the lateral axis.

Figure 9:
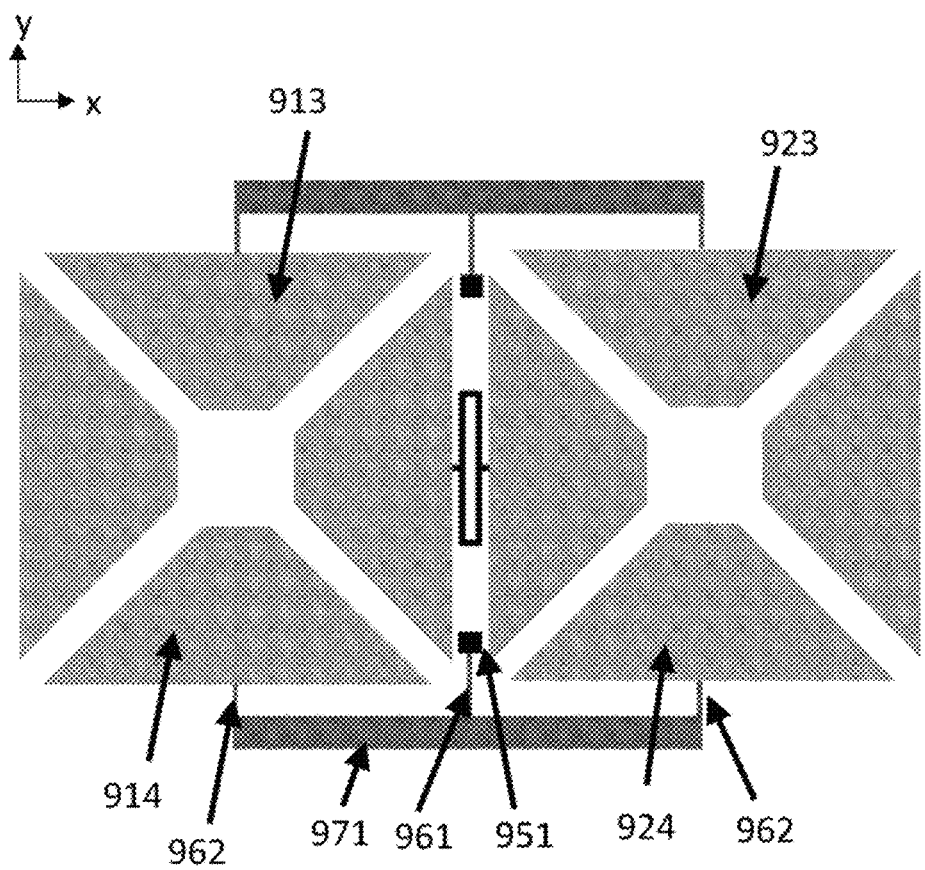

Other proof masses in the proof mass quartets can be connected with peripheral synchronization structures, for example of the kind illustrated in FIG. 9. Reference numbers 911-914 and 921-924 correspond to reference numbers 211-214 and 221-224, respectively, in FIG. 2a. As illustrated in FIG. 9, the synchronization structure comprises an upper part above the lateral axis and a separate lower part below the lateral axis. Only the lower part will be described in detail. The same considerations apply to the upper part as well.

The lower synchronization structure illustrated in FIG. 9 comprises an anchor point 951 aligned in the third transversal axis. The anchor point 951 may, but does not have to, be located between the fourth proof mass 914 of the first quartet and the and fourth proof mass 924 of the second quartet. It may also be located on the other side of the synchronization structure. The structure further comprises a relatively rigid lateral seesaw 971 which is connected to the anchor point 951 and to proof masses 914 and 924 with transversal torsion/flexure bars 961-962. These torsion/flexure bars are flexible for in-plane bending and for twisting, but they are rigid for out-of-plane bending. These torsion/flexure bars allow the lateral seesaw 971 to rotate about the third transversal axis, and thereby to synchronize the outof-plane anti-phase secondary oscillation modes of the fourth proof masses 914 and 924 illustrated in FIGS. 2b, 3b.

The upper synchronization structure can correspondingly synchronize the anti-phase out-of-plane oscillation of the third proof masses 913 and 923. Torsion/flexure bars 961-962 may also resist the linear movement of the lateral seesaw 971 along the vertical axis, and thereby prevent the out-of-plane cophasal oscillation mode of the fourth proof masses 914 and 924. The upper synchronization structure can correspondingly resist the cophasal out-of-plane oscillation of the third proof masses 913 and 923.

Torsion/flexure bars 961-962 may also allow the lateral seesaw 971 to rotate about a vertical axis, and thereby to synchronize the radial in-plane anti-phase oscillation mode of the fourth proof masses 914 and 924 illustrated in FIGS. 2a, 3b. The upper synchronization structure can correspondingly synchronize the in-plane anti-phase oscillation of the third proof masses 913 and 923. Torsion/flexure bars 961-962 also may resist the linear movement of the lateral seesaw 971 along a transversal axis, and thereby prevent the radial in-plane cophasal oscillation mode of the fourth proof masses 914 and 924. The upper synchronization structure can correspondingly resist the in-plane cophasal oscillation of the third proof masses 913 and 923.

It may be noted that if the proof masses of each quartet are synchronized by a synchronization body presented in FIG. 6b, 6c, 6d or 6e, then the cophasal in-plane radial oscillation of the two mass pairs of each quartet is prevented and thus, when preventing the cophasal radial in-plane oscillation of proof masses 914 and 924 and/or proof masses 913 and 923 by a lateral seesaw 971 and torsion/flexure bars 961-962, the anti-phase oscillation of proof masses 812 and 821 of FIG. 8b along the lateral axis is also indirectly prevented. This feature cannot be achieved by the coupling spring 84 of FIG. 8b.

Torsion/flexure bars 962 are flexible for in-plane bending and may therefore allow the in-plane tangential anti-phase oscillation of the proof masses 914 and 924 illustrated in FIGS. 2b, 2c and 3a but not synchronize it nor prevent the corresponding cophasal oscillation. The upper synchronization structure can correspondingly allow the in-plane tangential anti-phase oscillation of the third proof masses 913 and 923 but not synchronize it nor prevent the corresponding cophasal oscillation.

Out-of-plane oscillation may also be synchronized by other means not illustrated in this disclosure.

Drive and Sense Transducers

Capacitive or piezoelectric drive transducers may be incorporated in the gyroscope to facilitate primary oscillation. The gyroscope may comprise a control unit which is configured to apply a drive voltage signal to the drive transducers. The frequency of the drive voltage signals may in part determine the frequency and amplitude of the primary oscillation mode, and the amplitude of the drive voltage signals may in part determine the amplitude of the primary oscillation mode. For efficient excitation of the primary oscillation the frequency of the drive voltage should be close to the resonant frequency of the primary mechanical oscillator determined by the inertia of the proof masses and compliance of the suspenders, but an exact match is not mandatory. The same drive voltage signal may be applied to multiple drive transducers. Alternatively, two separate drive voltage signals may be used, and the phase difference between the first drive voltage signal and the second drive voltage signal may be 180 degrees. The first drive voltage signal may be applied to drive transducers in the first proof mass quartet, and the second drive voltage signal may be applied to drive transducers in the second proof mass quartet. Different drive voltage signals may also be applied to masses in the same proof mass quartet. Many other drive signal alternatives are also possible for driving the primary oscillation.

Capacitive or piezoelectric sense transducers may be incorporated in the gyroscope to measure secondary oscillation induced by the Coriolis force. The control unit may be configured to measure a sense voltage signal or sense current signal from the sense transducers. The amplitude of the sense voltage or sense current signal may be used to calculate the corresponding angular rotation rate. The sense voltage or sense current signal may be generated as a sum or difference or combination thereof of several sense signal components retrieved from separate sense transducers or as a general weighted linear combination of several sense signals retrieved from separate sense transducers.

Figure 10A:
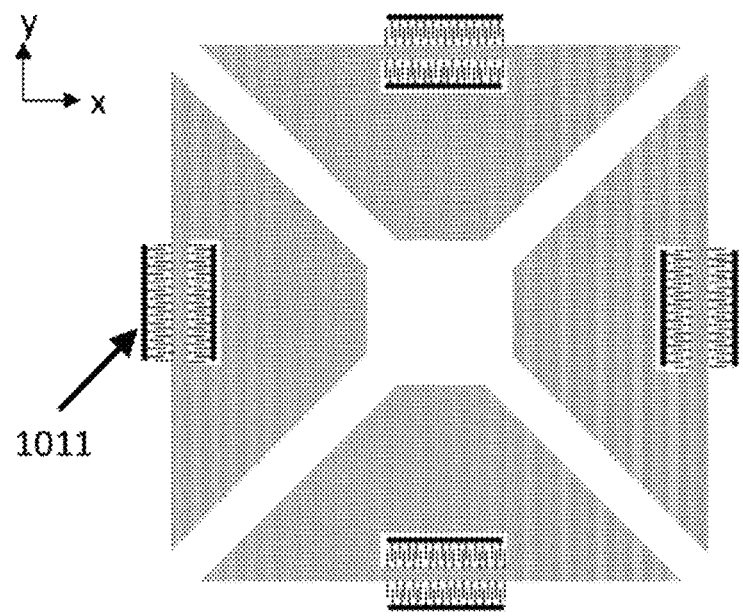
FIGS. 10a-10b and 11a-11b illustrate how capacitive drive and sense transducers may be incorporated in the gyroscope.

FIG. 10a illustrates a proof mass quartet with four capacitive outer drive transducers 1011. Each transducer comprises a set of rotor finger electrodes on the partly mobile proof masses and a set of stator finger electrodes on an adjacent fixed structure (the fixed structure is not illustrated). In this geometry, the capacitive drive transducers may be used to drive the first primary oscillation mode.

Figure 10B:
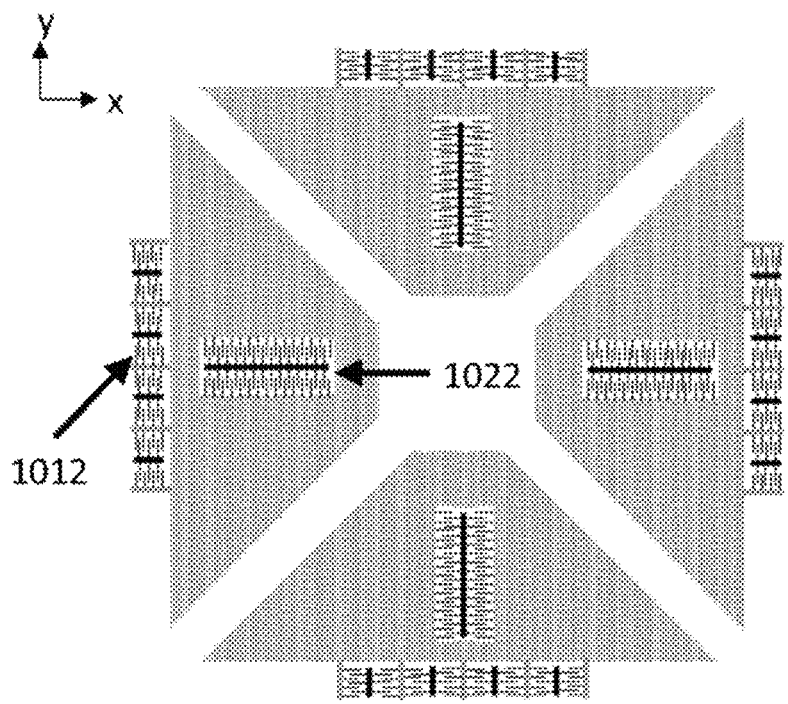

FIG. 10b illustrates a proof mass quartet with four capacitive outer drive transducers 1012 and four capacitive inner drive transducers 1022. The inner drive transducers are located in an opening formed within the respective proof mass. In this geometry, the capacitive drive transducers may be used to drive the second primary oscillation mode.

Figure 11A:
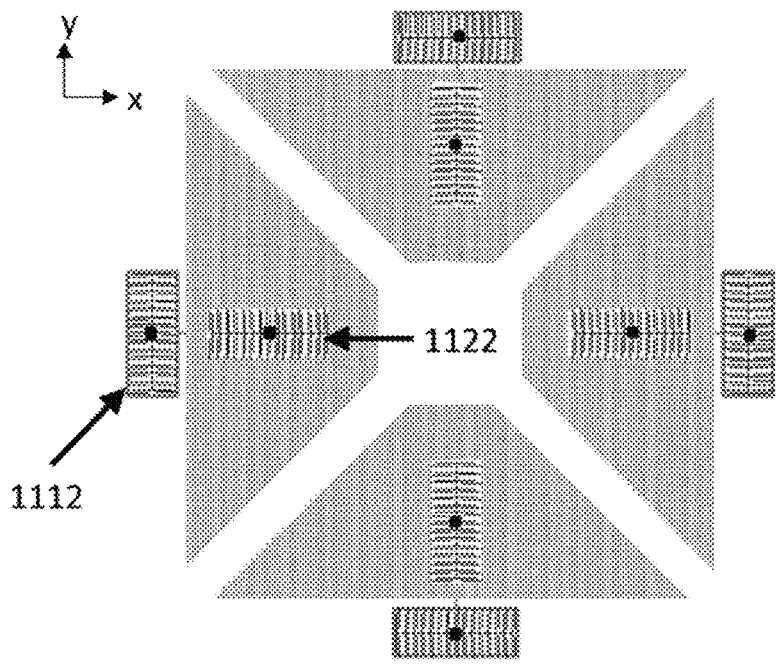

Similar arrangements can be made for sense transducers. FIG. 11a illustrates a proof mass quartet with four capacitive outer sense transducers 1112 and four capacitive inner sense transducers 1122. When some sense transducers are equipped with fingers oriented in the lateral direction, and others with fingers oriented in the transversal direction, both radial and tangential in-plane movement can be detected.

Figure 11B:
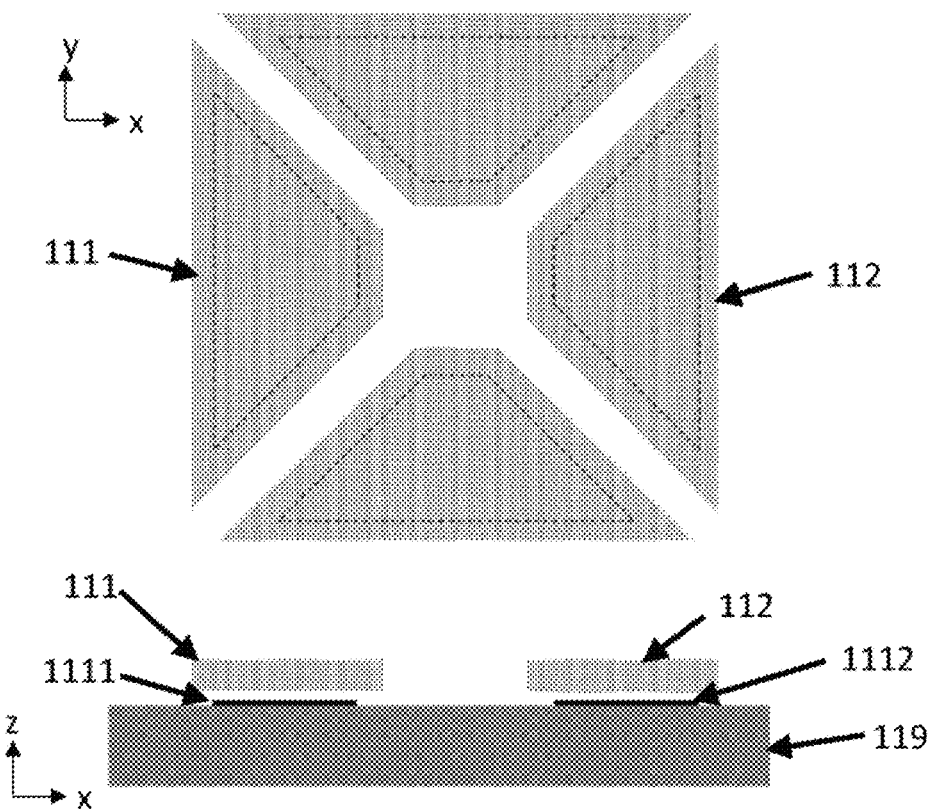

FIG. 11b illustrates a proof mass quartet with first proof mass 111, second proof mass 112, and capacitive sense transducers for detecting out-of-plane oscillation. The sense transducers comprise planar electrodes above and/or below the proof masses. In the upper figure, the location of the planar electrodes is illustrated with dashed lines. The area of the planar electrodes may be contained within the area of the proof masses, as illustrated in FIG. 11b, or the area of the proof masses may be contained within the area of the proof masses. The overlap between these areas should preferably not change when the masses undergo in-plane oscillation, since this might add undesired modulation to the out-of-plane sense signal.

The lower figure illustrates planar electrodes 1111 and 1112 on the surface of a supporting substrate 119. Opposing planar electrodes (not illustrated) may be formed on the proof masses 111 and 112 so that a capacitive parallel-plate measurement can be performed. Alternatively, the proof masses 111 and 112 may themselves be used as the second planar electrodes of the capacitive sense transducers.

The invention claimed is:

1. A microelectromechanical gyroscope, comprising:
   a first proof mass quartet and a second proof mass quartet in a device plane, with a corresponding first quartet center point and a corresponding second quartet center point which lie on a lateral axis, wherein four proof masses form the first proof mass quartet and wherein four proof masses form the second proof mass quartet, wherein the four proof masses which form the first proof mass quartet are in their rest position symmetrically arranged around the first quartet center point where the lateral axis crosses a first transversal axis orthogonally in the device plane, and the four proof masses which form the second proof mass quartet are in their rest position symmetrically arranged around the second quartet center point where the lateral axis crosses a second transversal axis orthogonally in the device plane, and wherein first and second proof masses in each proof mass quartet are aligned on the lateral axis in their rest position, and third and fourth proof masses in the first proof mass quartet are aligned on the first transversal axis in their rest position, and third and fourth proof masses in the second proof mass quartet are aligned on the second transversal axis in their rest position, and the rest positions of the first, second, third and fourth proof masses in relation to the corresponding quartet center point are the same in both quartets, and the second proof mass in the first proof mass quartet is adjacent and mechanically coupled to the first proof mass in the second proof mass quartet, and the gyroscope further comprises one or more drive transducers for setting the first and second proof mass quartets into primary oscillating motion, and one or more sense transducers for detecting secondary oscillating motion of the first and second proof mass quartets which is induced by the Coriolis force if the gyroscope undergoes angular rotation, and the gyroscope further comprises a suspension arrangement for suspending the first and second proof mass quartets from a fixed support structure, wherein the suspension structure is configured to accommodate the primary and secondary oscillating motion of the first and second proof mass quartets, and the drive transducers are configured to set all four proof masses in each proof mass quartet into primary oscillation in the device plane either in a first primary oscillation mode or in a second primary oscillation mode, wherein the first primary oscillation mode comprises motion where each proof mass oscillates in a radial direction in relation to the corresponding quartet center point, and the second primary oscillation mode comprises motion where each proof mass oscillates in a tangential direction in relation to the corresponding quartet center point, and the primary oscillation in the first primary oscillation mode is synchronized so that:

each proof mass in the first proof mass quartet moves toward the first quartet center point when the corresponding proof mass in the second proof mass quartet moves away from the second quartet center point, and vice versa, the first proof mass in each proof mass quartet moves toward the corresponding quartet center point when the second proof mass in the same proof mass quartet moves toward the same quartet center point, and away from the same quartet center point when the second proof mass in the same proof mass quartet moves away from the same quartet center point, the third proof mass in each proof mass quartet moves toward the corresponding quartet center point when the fourth proof mass in the same proof mass quartet moves toward the same quartet center point, and away from the same quartet center point when the fourth proof mass in the same proof mass quartet moves away from the same quartet center point, and the first and second proof masses in each proof mass quartet move toward the corresponding quartet center point when the third and fourth proof masses in the same proof mass quartet move away from the same quartet center point, and vice versa, and the primary oscillation in the second primary oscillation mode is synchronized so that:

each proof mass in the first proof mass quartet moves clockwise in relation to the first quartet center point when the corresponding proof mass in the second proof mass quartet moves counter-clockwise in relation to the second quartet center point, and vice versa, the first proof mass in each proof mass quartet moves clockwise in relation to the corresponding quartet center point when the second proof mass in the same proof mass quartet moves clockwise in relation to the same quartet center point, and counter-clockwise in relation to the same quartet center point when the second proof mass in the same proof mass quartet moves counter-clockwise in relation to the same quartet center point, the third proof mass in each proof mass quartet moves clockwise in relation to the corresponding quartet center point when the fourth proof mass in the same proof mass quartet moves clockwise in relation to the same quartet center point, and counter-clockwise in relation to the same quartet center point when the fourth proof mass in the same proof mass quartet moves counter-clockwise in relation the same quartet center point, and the first and second proof masses in each proof mass quartet move clockwise in relation to the corresponding quartet center point when the third and fourth proof masses in the same proof mass quartet move counter-clockwise in relation to the same quartet center point, and vice versa, and the secondary oscillation modes of the first and second proof mass quartets include a z-axis secondary mode, an x-axis secondary mode, and/or a y-axis secondary mode, so that, if the primary oscillation mode of each proof mass quartet is the first primary oscillation mode, then in response to rotation of the gyroscope about the z-axis, the z-axis secondary mode comprises motion where each proof mass in each proof mass quartet oscillates tangentially in relation to the corresponding quartet center point, in response to rotation of the gyroscope about an x-axis which is parallel to the lateral axis, the x-axis secondary mode comprises motion where each proof mass pair formed by third and fourth proof masses oscillates out of the device plane, in response to rotation of the gyroscope about the y-axis which is parallel to the first and second transversal axes, the y-axis secondary mode comprises motion where each proof mass pair formed by first and second proof masses oscillates out of the device plane, and so that, if the primary oscillation mode of each proof mass quartet is the second primary oscillation mode, then in response to rotation of the gyroscope about the z-axis, the z-axis secondary mode comprises motion where each proof mass oscillates radially in relation to the corresponding quartet center point, in response to rotation of the gyroscope about an x-axis which is parallel to the lateral axis, the x-axis secondary mode comprises motion where each proof mass pair formed by first and second proof masses oscillates out of the device plane, in response to rotation of the gyroscope about the y-axis which is parallel to the first and second transversal axes, the y-axis secondary mode comprises motion where each proof mass pair formed by third and fourth proof masses oscillates out of the device plane.

2. The microelectromechanical gyroscope according to claim 1, wherein the second proof mass in the first proof mass quartet is mechanically coupled to the first proof mass in the second proof mass quartet by at least one coupling spring aligned on a third transversal axis in the device plane, and the at least one coupling spring:

allows the second proof mass in the first proof mass quartet and the first proof mass in the second proof mass quartet to simultaneously rotate in opposite out-of-plane directions about corresponding transversal axes, allows the second proof mass in the first proof mass quartet and the first proof mass in the second proof mass quartet to simultaneously rotate in opposite in-plane directions about corresponding vertical axes, allows simultaneous cophasal linear translation of the second proof mass in the first proof mass quartet and the first proof mass in the second proof mass quartet in a direction parallel to the lateral axis, parallel to any transversal axis, or parallel to any vertical axis.

\* \* \* \* \*